US007624252B2

(12) United States Patent
Sekiyama

(10) Patent No.: US 7,624,252 B2
(45) Date of Patent: Nov. 24, 2009

(54) PROCESSING DEVICE, METHOD OF DETERMINING INTERNAL CONFIGURATION OF PROCESSING DEVICE, AND PROCESSING SYSTEM

(75) Inventor: Hiroyuki Sekiyama, Yokohama (JP)

(73) Assignees: Fujitsu Microelectronics Limited, Tokyo (JP); Fujitsu Devices, Inc., Tokyo (JP)

( * ) Notice: Subject to any disclaimer, the term of this patent is extended or adjusted under 35 U.S.C. 154(b) by 288 days.

(21) Appl. No.: 11/553,165

(22) Filed: Oct. 26, 2006

(65) Prior Publication Data

US 2007/0124563 A1 May 31, 2007

(30) Foreign Application Priority Data

Nov. 28, 2005 (JP) ............................. 2005-342158
Mar. 29, 2006 (JP) ............................. 2006-091025

(51) Int. Cl.
*G06F 9/44* (2006.01)
*G06F 17/50* (2006.01)
(52) U.S. Cl. ........................................ 712/216; 703/13
(58) Field of Classification Search ................. 712/216, 712/217, 219; 713/13, 14
See application file for complete search history.

(56) References Cited

U.S. PATENT DOCUMENTS

| 5,392,033 | A | * | 2/1995 | Oman et al. ................ 710/107 |
| 5,615,350 | A | * | 3/1997 | Hesson et al. .............. 712/218 |
| 5,625,789 | A | * | 4/1997 | Hesson et al. .............. 712/217 |
| 5,745,724 | A | * | 4/1998 | Favor et al. ................ 712/213 |
| 5,799,165 | A | * | 8/1998 | Favor et al. ................ 712/214 |
| 5,881,261 | A | * | 3/1999 | Favor et al. ................ 712/214 |
| 5,884,059 | A | * | 3/1999 | Favor et al. ................ 712/215 |
| 7,047,397 | B2 | * | 5/2006 | Segelken .................... 712/221 |

FOREIGN PATENT DOCUMENTS

JP 6-231283 A 8/1994
JP 2000-36737 A 2/2000

OTHER PUBLICATIONS

Ismail, Tarek Ben and Ahmed, Amine Jerraya. "Synthesis Steps and Design Models for Codesign". IEEE © 1995. pp. 44-52.*
Ernst, Rolf. "Codesign of Embedded Systems: Status and Trends". IEEE © 1998. pp. 45-54.*
Cesario, Wander O.; Lyonnard, Damien; Nicolescu, Gabriela; Paviot, Yanick; Yoo, Sungjoo; Jerraya, Ahmed A.; Gauthier, Lovic;, and Diaz-Nava, Mario. "Multiprocessor SoC Platforms: A Component-Based Design Approach". IEEE © 2002. pp. 52-63.*
Chandy, K. Mani and Misra, Jayadev. "Distributed Simulation: A Case Study in Design and Verification of Distributed Programs". IEEE © 1979. pp. 440-452.*

* cited by examiner

*Primary Examiner*—Aimee J Li
(74) *Attorney, Agent, or Firm*—Arent Fox LLP

(57) ABSTRACT

In order to execute desired operation on data to be processed of each data series to output processed data, a processing unit changes an arithmetic processing function by establishing a connection relation of internal components according to connection information. In each processing cycle, a control unit executes control processing to pieces of instruction information in a predetermined sequence and outputs, as connection information, an assignment of the components thereof obtained in the control processing. The control processing is to determine the components of the processing unit to be assigned to an operation when the operation indicated by the instruction information is executable, and to shift a processing cycle in which the operation is executed to a subsequent processing cycle, upon satisfying a data output timing of an output buffer unit, when the operation indicated by the instruction information is unexecutable due to lack of the components of the processing unit.

23 Claims, 22 Drawing Sheets

Fig. 12

| | common information | | 0th operation information | | | | | | 1st operation information | | | | | | 2nd operation information | | | | | | 3rd operation information | | | | | | 4th operation information | | | | | | 5th operation information | | | | | |
|---|---|---|---|---|---|---|---|---|---|---|---|---|---|---|---|---|---|---|---|---|---|---|---|---|---|---|---|---|---|---|---|---|---|---|---|---|---|---|
| | exec_num | opd_num | exec_type[0] | opd0[0] | opd1[0] | fin0[0] | fin1[0] | fout[0] | exec_type[1] | opd0[1] | opd1[1] | fin0[1] | fin1[1] | fout[1] | exec_type[2] | opd0[2] | opd1[2] | fin0[2] | fin1[2] | fout[2] | exec_type[3] | opd0[3] | opd1[3] | fin0[3] | fin1[3] | fout[3] | exec_type[4] | opd0[4] | opd1[4] | fin0[4] | fin1[4] | fout[4] | exec_type[5] | opd0[5] | opd1[5] | fin0[5] | fin1[5] | fout[5] |
| t$^{th}$ cycle | 6 | 0 | 0 | 0 | 1 | 1 | 1 | 0 | 1 | 0 | 1 | 1 | 1 | 0 | 0 | 1 | 2 | 1 | 1 | 0 | 1 | 1 | 2 | 1 | 1 | 0 | 0 | 2 | 0 | 1 | 1 | 0 | 1 | 2 | 0 | 1 | 1 | 0 |
| t+1$^{th}$ cycle | 3 | 6 | 2 | 0 | 1 | 0 | 0 | 0 | 2 | 2 | 3 | 0 | 0 | 0 | 2 | 4 | 5 | 0 | 0 | 0 | | | | | | | | | | | | | | | | | | |
| t+2$^{th}$ cycle | 2 | 3 | 0 | 0 | 1 | 0 | 0 | 0 | 3 | 2 | * | 0 | * | 0 | | | | | | | | | | | | | | | | | | | | | | | | |
| t+3$^{th}$ cycle | 1 | 2 | 0 | 0 | 1 | 0 | 0 | 1 | | | | | | | | | | | | | | | | | | | | | | | | | | | | | | |

| priority level (ILIi) | priority level (OLIi) | priority level (TLIi) |
|---|---|---|
| 0 | 0 | 0 |
| 0 | 1 | 1 |
| 1 | 0 | 1 |
| 0 | 2 | 2 |
| 1 | 1 | 2 |
| 2 | 0 | 2 |
| 0 | 3 | 3 |
| 1 | 2 | 3 |
| 2 | 1 | 3 |
| 3 | 0 | 3 |
| 0 | 4 | 4 |
| 1 | 3 | 4 |
| 2 | 2 | 4 |
| 3 | 1 | 4 |
| 4 | 0 | 4 |
| 1 | 4 | 5 |
| 2 | 3 | 5 |
| 3 | 2 | 5 |
| 4 | 1 | 5 |
| 2 | 4 | 6 |
| 3 | 3 | 6 |
| 4 | 2 | 6 |
| 3 | 4 | 7 |
| 4 | 3 | 7 |
| 4 | 4 | 8 |

Fig. 15

| internal variable | meaning |
|---|---|
| exec_num[i] | number of operations in series i |
| opd_num[i] | number of operands in series i whose input origins are resiters REG |
| exec_type[i][j] | kind of $j^{th}$ operation in series i |
| opd0[i][j] | identification number of operand 0 of $j^{th}$ operation in series i |
| opd1[i][j] | identification number of operand 1 of $j^{th}$ operation in series i |
| fin0[i][j] | storage place of operand 0 of $j^{th}$ operation in series i |
| fin1[i][j] | storage place of operand 1 of $j^{th}$ operation in series i |
| fout[i][j] | storage place of processed data of $j^{th}$ operation in series i |
| vr | temporary variable for assingment of registers REG |
| va | temporary variable for assingment of operators OPA |
| vb | temporary variable for assingment of operators OPB |
| vc | temporary variable for assingment of operators OPC |
| ofst_r | offset for assingment of registers REG |
| ofst_a | offset for assingment of operators OPA |
| ofst_b | offset for assingment of operators OPB |
| ofst_c | offset for assingment of operators OPC |
| ofst_r_l[i] | offset for assingment of resisters REG regarding series i in preceding processing cycle |
| stad_fin[i] | read start address of input FIFO unit in series i |
| stad_fout[i] | write start address of output FIFO unit in series i |
| pri | priority sequence number |

Fig. 16

| cycle | series | operation | input origin of operand 0 | input origin of operand 1 | operator | output destination of processed data | pt_l | vr | va | vb | vc | ofst_r | ofst_a | ofst_b | ofst_c | ofst_r_l[0] | ofst_r_l[1] | |
|---|---|---|---|---|---|---|---|---|---|---|---|---|---|---|---|---|---|---|
| t | 0 | 0 | REG(stad_fin[0])="a" | REG(stad_fin[0]+1)="b" | ADD(0) | REG(0) | 0 | 1 | 1 | 0 | 0 | 0 | 0 | 0 | 0 | 0 | 0 | …⟨1⟩ |
| | | 1 | REG(stad_fin[0])="a" | REG(stad_fin[0]+1)="b" | SUB(0) | REG(1) | 0 | 2 | 1 | 1 | 0 | 0 | 0 | 0 | 0 | 0 | 0 | …⟨2⟩ |
| | | 2 | REG(stad_fin[0]+1)="b" | REG(stad_fin[0]+2)="c" | ADD(1) | REG(2) | 0 | 3 | 2 | 1 | 0 | 0 | 0 | 0 | 0 | 0 | 0 | …⟨3⟩ |
| | | 3 | REG(stad_fin[0]+1)="b" | REG(stad_fin[0]+2)="c" | SUB(1) | REG(3) | 0 | 4 | 2 | 2 | 0 | 0 | 0 | 0 | 0 | 0 | 0 | …⟨4⟩ |
| | | 4 | REG(stad_fin[0]+2)="c" | REG(stad_fin[0])="a" | ADD(2) | REG(4) | 0 | 5 | 3 | 2 | 0 | 0 | 0 | 0 | 0 | 0 | 0 | …⟨5⟩ |
| | | 5 | REG(stad_fin[0]+2)="c" | REG(stad_fin[0])="a" | SUB(2) | REG(5) | 0 | 6 | 3 | 3 | 0 | 0 | 0 | 0 | 0 | 0 | 0 | …⟨6⟩ |
| | | after execution of step S29 for series 0 | | | | | 1 | 0 | 0 | 0 | 0 | 6 | 3 | 3 | 0 | 0 | 0 | …⟨7⟩ |
| | 1 | 0 | REG(stad_fin[1])="d" | REG(stad_fin[1]+1)="e" | ADD(3) | REG(6) | 1 | 1 | 1 | 0 | 0 | 6 | 3 | 3 | 0 | 0 | 0 | …⟨8⟩ |
| | | 1 | REG(stad_fin[1]+2)="f" | REG(stad_fin[1]+3)="g" | SUB(4) | REG(7) | 1 | 2 | 2 | 0 | 0 | 6 | 3 | 3 | 0 | 0 | 0 | …⟨9⟩ |
| | | after execution of step S29 for series 1 | | | | | 2 | 0 | 0 | 0 | 0 | 8 | 5 | 3 | 0 | 0 | 6 | …⟨10⟩ |
| | | after execution of step S2 | | | | | 0 | 0 | 0 | 0 | 0 | 0 | 0 | 0 | 0 | 0 | 6 | …⟨11⟩ |
| t+1 | 0 | 0 | REG(0) | REG(1) | MUL(0) | REG(0) | 0 | 1 | 0 | 0 | 1 | 0 | 0 | 0 | 0 | 0 | 6 | …⟨12⟩ |
| | | 1 | REG(2) | REG(3) | MUL(1) | REG(1) | 0 | 2 | 0 | 0 | 2 | 0 | 0 | 0 | 0 | 0 | 6 | …⟨13⟩ |
| | | 2 | REG(4) | REG(5) | MUL(2) | REG(2) | 0 | 3 | 0 | 0 | 3 | 0 | 0 | 0 | 0 | 0 | 6 | …⟨14⟩ |
| | | after execution of step S29 for series 0 | | | | | 1 | 0 | 0 | 0 | 0 | 0 | 0 | 0 | 0 | 0 | 6 | …⟨15⟩ |
| | 1 | 0 | REG(6) | REG(7) | ADD(0) | REG(3) | 1 | 1 | 1 | 1 | 0 | 3 | 0 | 0 | 0 | 0 | 3 | …⟨16⟩ |
| | | after execution of step S29 for series 1 | | | | | 2 | 0 | 0 | 0 | 0 | 4 | 1 | 0 | 0 | 0 | 3 | …⟨17⟩ |
| | | after execution of step S2 | | | | | 0 | 0 | 0 | 0 | 0 | 0 | 0 | 0 | 0 | 0 | 3 | …⟨18⟩ |
| t+2 | 0 | 0 | REG(0) | REG(1) | ADD(0) | REG(0) | 0 | 1 | 0 | 0 | 1 | 0 | 0 | 0 | 0 | 0 | 3 | …⟨19⟩ |
| | | 1 | REG(2) | — | transfer | REG(1) | 0 | 2 | 0 | 0 | 2 | 0 | 0 | 0 | 0 | 0 | 3 | …⟨20⟩ |
| | | after execution of step S29 for series 0 | | | | | 1 | 0 | 0 | 0 | 0 | 2 | 1 | 0 | 0 | 0 | 3 | …⟨21⟩ |
| | 1 | 0 | REG(3) | REG(stad_fin[1]+4)="h" | MUL(0) | REG(stad_fout[1])="x" | 1 | 1 | 1 | 0 | 1 | 2 | 1 | 0 | 3 | 0 | 3 | …⟨22⟩ |
| | | after execution of step S2 | | | | | 0 | 0 | 0 | 0 | 0 | 3 | 1 | 0 | 0 | 0 | 2 | …⟨23⟩ |
| t+3 | 0 | 0 | REG(0) | REG(1) | ADD(0) | REG(stad_fout[0])="x" | 0 | 1 | 0 | 0 | 1 | 0 | 0 | 0 | 1 | 0 | 2 | …⟨24⟩ |
| | | after execution of step S29 for series 0 | | | | | 1 | 0 | 0 | 0 | 0 | 1 | 1 | 0 | 0 | 0 | 2 | …⟨25⟩ |
| | | after execution of step S2 | | | | | 0 | 0 | 0 | 0 | 0 | 0 | 0 | 0 | 0 | 0 | 2 | …⟨26⟩ |
| | | | | | | | 0 | 0 | 0 | 0 | 0 | 0 | 0 | 0 | 0 | 0 | 2 | …⟨27⟩ |

Fig. 19

| cycle | series | operation | input origin of operand 0 | input origin of operand 1 | operator | output destination of processed data | pri | vf | va | vb | vc | ofst_r | ofst_a | ofst_b | ofst_c | ofst_r_i[0] | ofst_r_i[1] | |
|---|---|---|---|---|---|---|---|---|---|---|---|---|---|---|---|---|---|---|
| t | 0 | 0 | REG(stad_fin[0])="a" | REG(stad_fin[0]+1)="b" | ADD(0) | REG(0) | 0 | 1 | 1 | 0 | 0 | 0 | 0 | 0 | 0 | 0 | 0 | ···⟨1⟩ |
|   |   | 1 | REG(stad_fin[0])="a" | REG(stad_fin[0]+1)="b" | SUB(0) | REG(1) | 0 | 2 | 1 | 1 | 0 | 0 | 0 | 0 | 0 | 0 | 0 | ···⟨2⟩ |
|   |   | 2 | REG(stad_fin[0]+1)="b" | REG(stad_fin[0]+2)="c" | ADD(1) | REG(2) | 0 | 3 | 2 | 1 | 0 | 0 | 0 | 0 | 0 | 0 | 0 | ···⟨3⟩ |
|   |   | 3 | REG(stad_fin[0]+1)="b" | REG(stad_fin[0]+2)="c" | SUB(1) | REG(3) | 0 | 4 | 2 | 2 | 0 | 0 | 0 | 0 | 0 | 0 | 0 | ···⟨4⟩ |
|   |   | 4 | REG(stad_fin[0]+2)="c" | REG(stad_fin[0])="a" | ADD(2) | REG(4) | 0 | 5 | 3 | 2 | 0 | 0 | 0 | 0 | 0 | 0 | 0 | ···⟨5⟩ |
|   |   | 5 | REG(stad_fin[0]+2)="c" | REG(stad_fin[0])="a" | SUB(2) | REG(5) | 0 | 6 | 3 | 3 | 0 | 0 | 0 | 0 | 0 | 0 | 0 | ···⟨6⟩ |
|   |   | after execution of step S29 for series 0 | | | | | 1 | 0 | 0 | 3 | 0 | 6 | 3 | 3 | 0 | 0 | 6 | ···⟨7⟩ |
|   |   | after execution of step S29 for series 1 | | | | | 2 | 0 | 0 | 3 | 0 | 6 | 3 | 3 | 0 | 0 | 6 | ···⟨8⟩ |
|   |   | after execution of step S2 | | | | | 0 | 0 | 0 | 0 | 0 | 0 | 0 | 0 | 0 | 0 | 6 | ···⟨9⟩ |
| t+1 | 0 | 0 | REG(0) | REG(1) | MUL(0) | REG(0) | 0 | 1 | 0 | 0 | 1 | 0 | 0 | 0 | 0 | 0 | 6 | ···⟨10⟩ |
|   |   | 1 | REG(2) | REG(3) | MUL(1) | REG(1) | 0 | 2 | 0 | 0 | 2 | 0 | 0 | 0 | 0 | 0 | 6 | ···⟨11⟩ |
|   |   | 2 | REG(4) | REG(5) | MUL(2) | REG(2) | 0 | 3 | 0 | 0 | 3 | 0 | 0 | 0 | 0 | 0 | 6 | ···⟨12⟩ |
|   |   | after execution of step S29 for series 0 | | | | | 1 | 0 | 0 | 0 | 0 | 3 | 0 | 0 | 3 | 0 | 6 | ···⟨13⟩ |
| t+1 | 1 | 0 | REG(stad_fin[1])="d" | REG(stad_fin[1]+1)="e" | ADD(0) | REG(3) | 1 | 1 | 1 | 0 | 0 | 3 | 0 | 0 | 3 | 0 | 6 | ···⟨14⟩ |
|   |   | 1 | REG(stad_fin[1]+2)="f" | REG(stad_fin[1]+3)="g" | ADD(1) | REG(4) | 1 | 2 | 2 | 0 | 0 | 3 | 0 | 0 | 3 | 0 | 6 | ···⟨15⟩ |
|   |   | after execution of step S29 for series 1 | | | | | 2 | 0 | 0 | 0 | 0 | 5 | 2 | 0 | 3 | 0 | 3 | ···⟨16⟩ |
|   |   | after execution of step S2 | | | | | 0 | 0 | 0 | 0 | 0 | 0 | 0 | 0 | 0 | 0 | 3 | ···⟨17⟩ |
| t+2 | 0 | 0 | REG(0) | REG(1) | ADD(0) | REG(0) | 0 | 1 | 1 | 0 | 0 | 2 | 0 | 0 | 0 | 0 | 3 | ···⟨18⟩ |
|   |   | 1 | REG(2) | — | transfer |  | 0 | 2 | 1 | 0 | 0 | 2 | 0 | 0 | 0 | 0 | 3 | ···⟨19⟩ |
|   |   | after execution of step S29 for series 0 | | | | | 1 | 0 | 0 | 0 | 0 | 3 | 0 | 0 | 0 | 0 | 3 | ···⟨20⟩ |
| t+2 | 1 | 0 | REG(3) | REG(4) | ADD(1) | REG(2) | 1 | 1 | 1 | 0 | 0 | 2 | 1 | 0 | 0 | 0 | 3 | ···⟨21⟩ |
|   |   | after execution of step S29 for series 1 | | | | | 2 | 0 | 0 | 0 | 0 | 2 | 1 | 0 | 0 | 0 | 2 | ···⟨22⟩ |
|   |   | after execution of step S2 | | | | | 0 | 0 | 0 | 0 | 0 | 0 | 0 | 0 | 0 | 0 | 2 | ···⟨23⟩ |
| t+3 | 0 | 0 | REG(0) | REG(1) | ADD(0) | REG(stad_fout[0])="x" | 0 | 1 | 1 | 0 | 0 | 1 | 1 | 0 | 0 | 0 | 2 | ···⟨24⟩ |
|   |   | after execution of step S29 for series 0 | | | | | 1 | 0 | 0 | 0 | 0 | 1 | 1 | 0 | 0 | 0 | 2 | ···⟨25⟩ |
| t+3 | 1 | 0 | REG(2) | REG(stad_fin[1]+4)="h" | MUL(0) | REG(stad_fout[1])="x" | 1 | 1 | 1 | 0 | 0 | 1 | 1 | 0 | 0 | 0 | 2 | ···⟨26⟩ |
|   |   | after execution of step S29 for series 1 | | | | | 2 | 0 | 0 | 0 | 0 | 2 | 1 | 0 | 0 | 0 | 1 | ···⟨27⟩ |
|   |   | after execution of step S2 | | | | | 0 | 0 | 0 | 0 | 0 | 0 | 0 | 0 | 0 | 0 | 1 | ···⟨28⟩ |

Fig. 20

PROCESSING DEVICE, METHOD OF DETERMINING INTERNAL CONFIGURATION OF PROCESSING DEVICE, AND PROCESSING SYSTEM

CROSS REFERENCE TO RELATED APPLICATION

This application is based upon and claims the benefit of priority from Japanese Patent Application No. 2005-342158, filed on Nov. 28, 2005 and No. 2006-091025, filed on Mar. 29, 2006, and the entire contents of which are incorporated herein by reference.

BACKGROUND OF THE INVENTION

1. Field of the Invention

The present invention relates to a processing device, a method of determining an internal configuration of the processing device, and a processing system.

2. Description of the Related Art

As a means for LSI (Large Scale Integration) realizing desired application, there are ASIC (Application Specific Integrated Circuit), processors, and the like. Being hard-wired, the ASIC has a drawback of low programmability. In addition, the ASIC realizes the application by the development to transistors, and therefore, in a series of operations from the start to end of application processing, efficiency in terms of effective use of resources is low.

The processors, if adopting a distributed processing architecture such as multi-processing where resources are not shared, require a compiler with a high breakdown capability for the purpose of task breakdown of application to each processor element. However, at present, such a compiler is not available, and after the task breakdown is manually performed, an enormous amount of time has to be spent for minute adjustment in order to optimize the task breakdown.

Moreover, the processors, if adopting the distributed processing architecture where resources are not shared, have a drawback that it is difficult to realize a high usage rate of the resources. Because the resources are not shared among the processors, each of the processors has to use up the limited resources. For this reason, even with the difficulty in the task breakdown and in the optimization of the task breakdown, the processors cannot be said to have full advantage in terms of processing performance and circuit area.

More specifically, in a multiprocessor, a plurality of processor cores are connected to one another via a network or a bus, and an expansion processing unit or a programmable expansion processing unit is provided exclusively for each of the processor cores. Each processor core uses resources of the expansion processing unit or programmable expansion processing unit to execute arithmetic processing. However, since the processor cores are provided with the processing resources independently, they do not always use the resources fully efficiently to deal with tasks assigned to each of them. In many cases, resource usage is not efficient such as a case where some processor cores are frequently idle, finishing the arithmetic processing in a short time while some processor cores constantly work on the arithmetic processing and cannot complete it by the time required sometimes. Such a case further increases as more importance is put on efficiency in software design (function assignment). On the contrary, loads of task breakdown and a compiler increase as more importance is put on resource usage efficiency. It is considered that it is difficult to develop such a compiler.

Under the above-described circumstances, there is a demand for an art that can easily realize desired application and realize effective use of resources. In order to meet such a demand, for example, LSI whose architecture is reconfigurable (reconfigurable LSI) is being developed.

Japanese Unexamined Patent Application Publication No. 2000-36737 discloses an art for building logic architecture using an electrically reconfigurable gate array. Japanese Unexamined Patent Application Publication No. Hei 6-231283 discloses an art in which a programmable wiring area enabling interconnection of input/output circuits or interconnection of an input/output circuit and a logic/wiring block is provided inside a programmable logic chip, whereby an increase in delay amount and an increase in wiring elements used for chip-to-chip wiring are prevented when a multi-chip system is configured.

In a processing device constituted as LSI, the speed and integration degree of a processing unit is on an increasing trend, but an external interface unit is not necessarily improved in speed as much as the processing unit. This involves a possibility that the speed and the integration degree of the processing unit are higher than necessary. This is because an operating speed (processing speed) of the processing unit may be slow, providing that it falls in a range satisfying a desired throughput (the number of times the processing device outputs processed data to an external part per unit time). That the speed and the integration degree of the processing unit are excessively high implies that there exist a large number of resources which are not used for processing (registers, operators, and so on) and thus a circuit area is uselessly large.

SUMMARY OF THE INVENTION

It is an object of the present invention to provide a technique to reduce the number of processing resources to a minimum without deteriorating throughput of a processing device.

According to one embodiment of the present invention, a processing device includes a plurality of input buffer units, a processing unit, a plurality of output buffer units, and a control unit. The input buffer units are provided in correspondence with a plurality of data series. Each of the input buffer units stores corresponding external input data to output the external input data as data to be processed. The processing unit changes an arithmetic processing function by establishing a connection relation of internal components according to connection information, in order to execute desired arithmetic processing on the data to be processed in each of the data series to output processed data. For example, the processing unit includes a plurality of registers, a plurality of operators, a plurality of memories, and a connection relation changing unit. The registers, the operators, and the memories are provided as the components of the processing unit. The connection relation changing unit changes the connection relation of the registers, the operators, and the memories according to the connection information.

The output buffer units are provided in correspondence with the data series. Each of the output buffer units stores corresponding processed data to output the processed data as external output data. In each processing cycle, the control unit executes control processing to a plurality of pieces of instruction information corresponding to the data series in a predetermined sequence, and outputs as the connection information an assignment of the components of the processing unit obtained in the control processing. In the control processing, the control unit determines the components of the processing unit to be assigned to an operation, when the operation indicated by the instruction information is executable, and shifts the processing cycle in which the operation is to be executed to a subsequent processing cycle, upon satisfying a data output timing of the output buffer unit, when the operation indicated by the instruction information is not executable due to lack of the components of the processing unit.

The internal configuration (the number of the components of the processing unit) of the above-described processing device is determined through the execution of the following first to fourth steps. First, by using circuit description of the processing device which includes a parameter value representing a number of the components of the processing unit, the number of the components of the processing unit is set to a value with which the operation is always executable in the control processing, to execute a simulation (a first step). Next, the number of the components of the processing unit assigned to the operation by the control unit in the simulation is obtained as a virtual design value from a result of the simulation executed in the first step (a second step).

Next, the simulation is repeatedly executed until a data output timing of the output buffer unit is no longer satisfied, by using the circuit description of the processing device which includes a parameter value representing the number of the components of the processing unit, while the number of the components of the processing unit is decreased in sequence starting from an initial value smaller than the virtual design value (a third step). Then, based on a result of a final simulation where the data output timing of the output buffer unit is satisfied, out of the simulations executed in the third step, the number of the components of the processing unit assigned to the operation by the control unit in the final simulation is obtained as a real design value (a fourth step).

For example, in a case where the processing unit includes a plurality of registers, a plurality of operators, and a plurality of memories as the components, the simulation is executed in the first and third steps by using the circuit description of the processing device which includes parameter values representing numbers of the registers, the operators, and the memories as the number of the components of the processing unit. Preferably, the simulation is executed in the first and third steps by using the circuit description of the processing device which includes a parameter value representing a capacity of each of the memories in addition to the parameter values representing the numbers of the registers, the operators, and the memories.

In the processing device having the components of the processing unit in the number equal to the real design value obtained by the above-described method, even if, in the control processing to certain instruction information, the processing cycle in which the operation indicated by the instruction information is to be executed is changed to a subsequent processing cycle due to lack of the components of the processing unit, it is possible to satisfy the data output timing of the output buffer unit. Therefore, it is possible to reduce the number of the components of the processing unit to a minimum (the number of the registers, the number of the operators, and the number of the memories) without causing any deterioration in throughput of the processing device. That is, it is possible to reduce a circuit area while keeping processing performance of the processing device.

The processing device as structured above is used as a sub processing unit in a processing system which includes a plurality of main processing units corresponding to a plurality of data series; and the sub processing unit provided in common to the main processing units and executing arithmetic processing in place of the main processing units. An example of such a processing system is a multiprocessor. In the multiprocessor, a plurality of processor cores connected to one another via a network or a bus correspond to the plural main processing units and a common processing unit shared by the plural processor cores corresponds to the sub processing unit.

In the multiprocessor as structured above, it is possible to reduce the number of processing resources to a minimum while satisfying required performance of functions of the respective processor cores. Therefore, highly efficient use of the resources is achievable in the entire multiprocessor as well as reduction in area of the multiprocessor. Moreover, with regard to software design to implement application by the multiprocessor, the present invention can obtain a significant effect of facilitating the software design since resource usage efficiency is optimized by the common processing unit (the processing device of the present invention), compared to the fact that conventionally the resource usage efficiency optimization is done for each processor core at the time of software design. Thus using the processing device of the present invention as the common processing unit in the multiprocessor can attain total optimization in the system design.

In a preferable example in the aforesaid embodiment of the present invention, each of the input buffer units includes a first data storage unit and a first priority information generating unit. The first data storage unit stores the corresponding external input data in response to a write request and outputs the stored external input data as the data to be processed in response to a read request. The first priority information generating unit outputs first priority information indicating priority which heightens as a data storage amount of the first data storage unit increases. Each of the output buffer units includes a second data storage unit and a second priority information generating unit. The second data storage unit stores the corresponding processed data in response to a write request and outputs the stored processed data as the external output data in response to a read request. The second priority information generating unit outputs second priority information indicating priority which lowers as a data storage amount of the second data storage unit increases. The control unit includes a priority sequence decision unit and a component assignment unit. The priority sequence decision unit decides a priority sequence of the data series according to the plural pieces of first priority information supplied from the input buffer units and the plural pieces of second priority information supplied from the output buffer units. In each of the processing cycles, the component assignment unit executes the control processing to the plural pieces of instruction information corresponding to the data series, in an ascending order of the priority sequence of the corresponding data series decided by the priority sequence decision unit, and outputs, as the connection information, an assignment of the components of the processing unit obtained in the control processing.

Consequently, it is possible to execute, with the priority, arithmetic processing on the data series whose data highly needs to be outputted from the first data storage unit of the input buffer unit because the data storage amount thereof has increased, or on the data series whose data highly needs to be stored in the second data storage unit of the output buffer unit because the data storage amount thereof has decreased. Therefore, it is possible to execute the arithmetic processing on each of the data series more stably.

In a preferable example in the aforesaid embodiment of the present invention, the first priority information generating unit includes a first counter and a first priority decision unit. The first counter counts up in accordance with a data storage operation of the first data storage unit, while counting down in accordance with a data output operation of the first data storage unit. The first priority decision unit compares a counter value of the first counter with a first threshold value to decide priority and outputs first priority information indicating the decided priority. For example, the first priority decision unit includes a first threshold value setting unit setting the first threshold value. The counter value of the first counter corresponds to the data storage amount of the first data storage unit, and therefore, only by comparing the counter value of the first counter with the first threshold value, the first priority decision unit can generate the first priority information indicating priority which heightens as the data storage amount of the first data storage unit increases. Therefore, the first priority information generating unit can be configured with a simple circuit.

Further, when the processing device has such a configuration, in the first and third steps of the aforesaid method, preferably, the simulation is executed by using the circuit description of the processing device which includes parameter values representing a capacity of the first data storage unit and the first threshold value in addition to the parameter value representing the number of the components of the processing unit.

In a preferable example in the aforesaid embodiment of the present invention, the second priority information generating unit includes a second counter and a second priority decision unit. The second counter counts up in accordance with a data storage operation of the second data storage unit, while counting down in accordance with a data output operation of the second data storage unit. The second priority decision unit compares a counter value of the second counter with a second threshold value to decide priority and outputs second priority information indicating the decided priority. For example, the second priority decision unit includes a second threshold value setting unit setting the second threshold value. The counter value of the second counter corresponds to the data storage amount of the second data storage unit, and therefore, only by comparing the counter value of the second counter with the second threshold value, the second priority decision unit can generate the second priority information indicating priority which lowers as the data storage amount of the second data storage unit increases. Therefore, the second priority information generating unit can be configured with a simple circuit.

Further, when the processing device has such a configuration, in the first and third steps of the aforesaid method, preferably, the simulation is executed by using the circuit description of the processing device which includes parameter values representing a capacity of the second data storage unit and the second threshold value in addition to the parameter value representing the number of the components of the processing unit.

In a preferable example in the aforesaid embodiment of the present invention, the priority sequence decision unit includes a plurality of third priority decision units and an arbiter unit. The third priority decision units are provided in correspondence with the data series. Each of the third priority decision units decides priority by referring to the first priority information supplied from the corresponding input buffer, the second priority information supplied from the corresponding output buffer unit, and a priority definition table and outputs third priority information indicating the decided priority. The arbiter unit decides a priority sequence of the data series according to the plural pieces of third priority information supplied from the third priority decision units. Since the third priority decision unit decides the priority of each of the data series on the priority on both of the input and output sides, and the arbiter determines the priority sequence of the data series based on total priority of each of the data series, it is made easy to configure the priority sequence decision unit.

In a preferable example in the aforesaid embodiment of the present invention, the instruction information supplied to the control unit includes information indicating a number of operations in each of the processing cycles and also includes information indicating a kind of the operation and information for identifying the data to be processed regarding each of the operations. The instruction information need not include information uniquely indicating the components of the processing unit assigned to the operation, and the components of the processing unit assigned to the operation indicated by the instruction information is determined by the control unit on hardware. This can lighten a burden of a compiler generating the instruction information.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 12 is an explanatory chart showing a concrete example of the instruction information stored in the instruction information memories in FIG. 6;

FIG. 15 is an explanatory chart showing a concrete example of a priority level definition table used in a total priority level decision unit in FIG. 14;

FIG. 16 is an explanatory chart showing internal variables used in a resource assignment unit in FIG. 14;

FIG. 19 is an explanatory chart showing a resource assignment state and an internal variable state in a function simulation when the number of resources is set large;

FIG. 20 is an explanatory chart showing a resource assignment state and an internal variable state in a function simulation when the number of resources is set small;

DESCRIPTION OF THE PREFERRED EMBODIMENTS

Before an embodiment of the present invention is described, a basic concept of the present invention will be described using the drawings.

Figure 1:
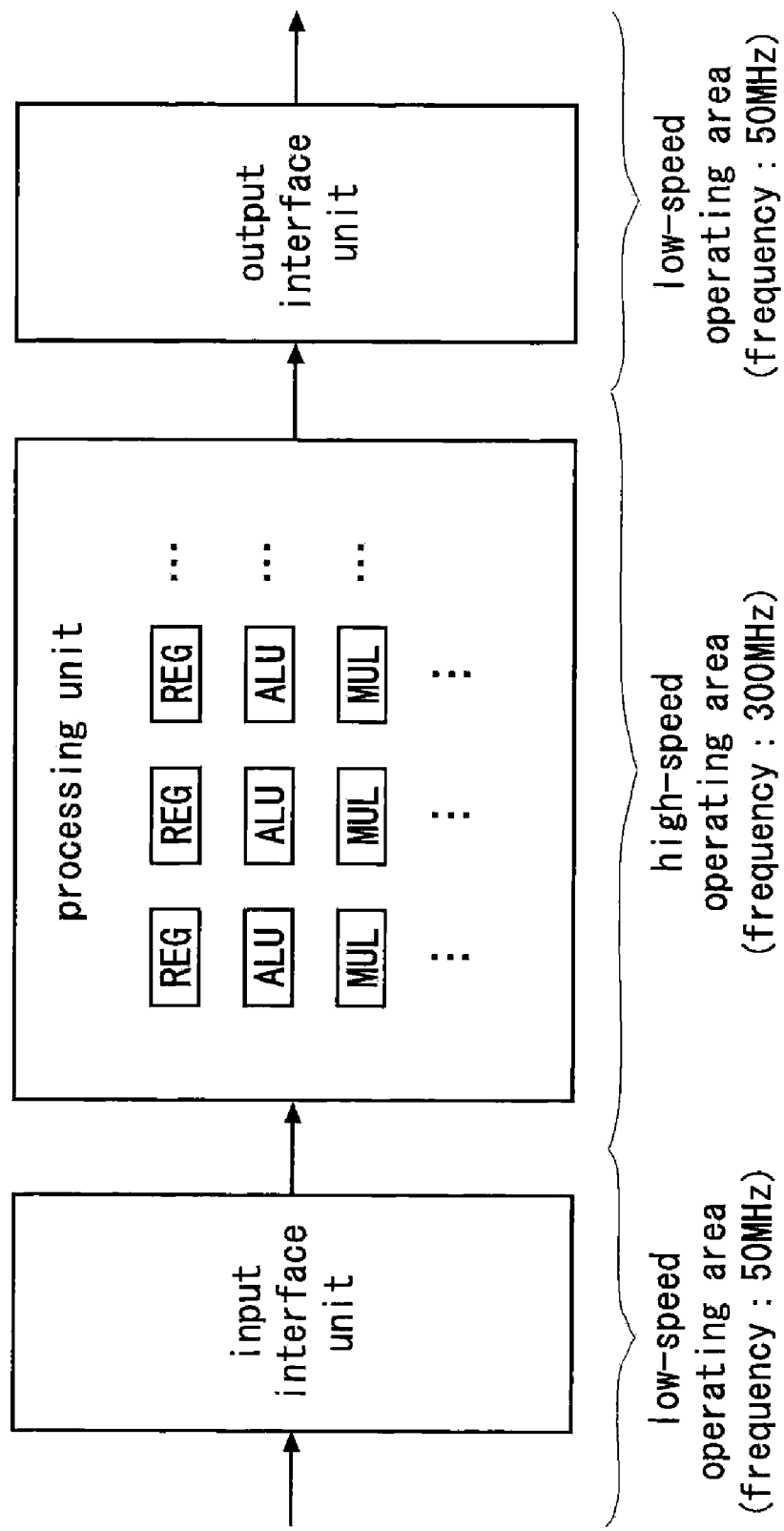
FIG. 1 is an explanatory diagram showing an overview of a processing unit.

FIG. 1 shows an overview of a processing device. In the processing device configured as LSI, the speed and the integration degree of a processing unit is on an increasing trend, but an input interface unit and an output interface unit are not necessarily improved in speed as much as the processing unit. Therefore, when, for example, an operating frequency of the processing unit is 300 MHz and an operating frequency of the input interface unit and the output interface unit is 50 MHz, the speed and integration degree of the processing unit could be excessively high. Therefore, there is an increasing need for more effective use of processing resources such as REG (registers), ALU or MUL (multipliers) in the processing unit. In order to realize the effective use of the processing resources, it is necessary to realize the optimum algorithm (processing program) for a predetermined hardware configuration or the optimum hardware configuration for predetermined algorithm. The present invention has been made aiming at realizing the optimum hardware configuration for predetermined algorithm.

Figure 2:
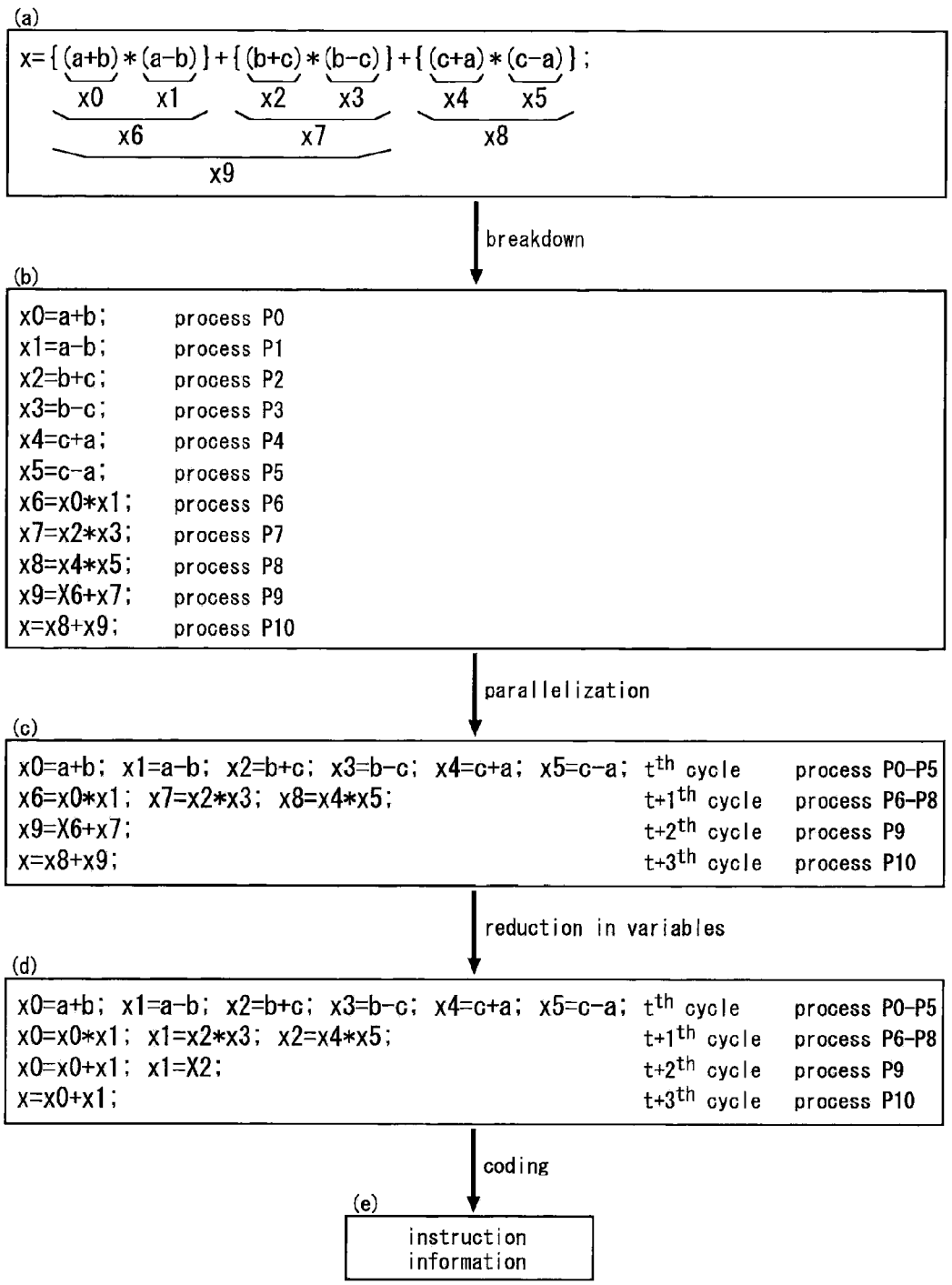
FIG. 2 is an explanatory chart showing processes of generating an instruction code used in the present invention.

FIG. 2 shows processes of generating instruction information used in the present invention. The following description will be on a case where, for example, processing program in FIG. 2(a) is realized in the processing device with the configuration shown in FIG. 1. First, as for the program (arithmetic processing) in FIG. 2(a), the arithmetic processing is broken down into a plurality of operation elements, taking operators (ALU, MUL, and so on) of the processing unit into consideration, and the relation of the operation elements is established with different processing cycles, whereby a program in FIG. 2(b) is generated. Note that the operators of the processing unit are assumed to be two-input one-output operators (operators each performing an operation on two data to be processed and outputs one resultant data).

Next, as for the program in FIG. 2(b), in order to realize parallel operations, the correspondence relation of each of the operation elements is established with the earliest possible cycle within a range not breaking data dependency relation, whereby a program in FIG. 2(c) is generated. Then, as for the program in FIG. 2(c), in order to realize reduction in variables, which is not very much considered when the program in FIG. 2(a) is generated, the variables are freed every time the processing cycle changes and the variables are used in ascending order of the identification number, whereby a program in FIG. 2(d) is generated. Thereafter, the program in FIG. 2(d) is coded, whereby instruction information (instruction code) is generated. In the present invention, registers or operators on hardware to be used for the execution of the operations (Processes P0~P10 in FIG. 2) are not uniquely determined by the instruction information, but the registers or the operators to be used in the execution of the operations are determined on the hardware. For example, the instruction information is generated so as to include not only information indicating the number of operations in each processing cycle, but also includes information indicating the kind of the operation and information for identifying operands, regarding each of the operations.

For example, the instruction information for a $t^{th}$ cycle generated as a result of the coding of the program in FIG. 2(d) is generated so as to include information indicating that the number of the operations is six, information indicating that the kind of a $0^{th}$ operation is "addition" and operands of the $0^{th}$ operation are data "a" and "b", information indicating that the kind of a $1^{st}$ operation is "subtraction" and operands of the $1^{st}$ operation are data "a" and "b", information that the kind of a $2^{nd}$ operation is "addition" and operands of the $2^{nd}$ operation are data "b" and "c", information that the kind of a $3^{rd}$ operation is "subtraction" and operands of the $3^{rd}$ operation are data "b" and "c", information indicating that the kind of a $4^{th}$ operation is "addition" and operands of the $4^{th}$ operation are data "c" and "a", and information indicating that the kind of a $5^{th}$ operation is "subtraction" and operands of the $5^{th}$ operation are data "c" and "a". Therefore, there is no resource limitation of architecture when the instruction information used in the present invention is generated. This lightens load of a compiler.

Figure 3:
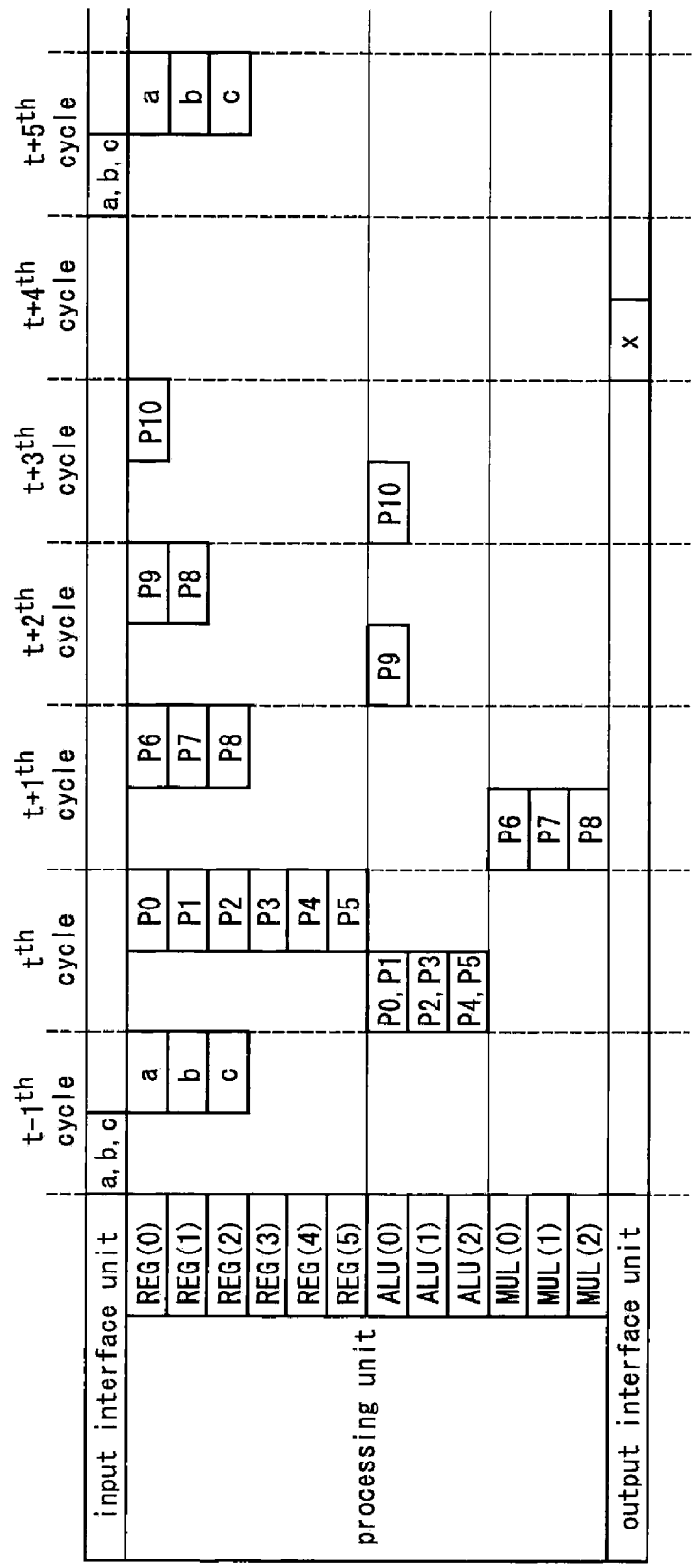
FIG. 3 is an explanatory chart showing an example of resource assignment to operations.

FIG. 3 shows an example of resource assignment to operations. The following description will be on a case where, for example, resources are assigned to the operations indicated by the instruction information generated from the program in FIG. 2(d). The number of the resources (the number of REG, the number of ALU, and the number of MUL) of the processing unit is assumed to be large enough. ALU is assumed to have functions of both an adder and a subtracter. Further, in a $t-1^{th}$ cycle, it is assumed that the external input data "a", "b", and "c" externally supplied to the input interface unit are stored in REG (0), REG (1), and REG (2) respectively.

In the $t^{th}$ cycle, in order to execute Processes P0, P1, REG (0) and REG (1) are commonly assigned as input origins of data to be processed (operands), ALU (0) is commonly assigned as an operator, and REG (0) and REG (1) are separately assigned as output destinations of processed data. In order to execute Processes P2, P3, REG (1) and REG (2) are commonly assigned as input origins of data to be processed, ALU (1) is commonly assigned as an operator, and REG (2) and REG (3) are separately assigned as output destinations of processed data. In order to execute Processes P4, P5, REG (2) and REG (0) are commonly assigned as input origins of data to be processed, ALU (2) is commonly assigned as an operator, and REG (4) and REG (5) are separately assigned as output destinations of processed data.

In a $t+1^{th}$ cycle, in order to execute Process P6, REG (0) and REG (1) are assigned as input origins of data to be processed, MUL (0) is assigned as an operator, and REG (0) is assigned as an output destination of processed data. In order to execute Process P7, REG (2) and REG(3) are assigned as input origins of data to be processed, MUL (1) is assigned as an operator, and REG (1) is assigned as an output destination of processed data. In order to execute Process P8, REG (4) and REG (5) are assigned as input origins of data to be processed, MUL (2) is assigned as an operator, and REG (2) is assigned as an output destination of processed data.

In a $t+2^{th}$ cycle, in order to execute Process P9, REG (0) and REG (1) are assigned as input origins of data to be processed, ALU (0) is assigned as an operator, and REG (0) is assigned as an output destination of processed data. In order to execute the transfer of the processed data of Process P8, REG (2) is assigned as a transfer origin and REG (1) is assigned as a transfer destination.

In a $t+3^{th}$ cycle, in order to execute Process P10, REG (0) and REG (1) are assigned as input origins of data to be processed, ALU (0) is assigned as an operator, and REG (0) is assigned as an output destination of processed data. Consequently, the output interface unit comes to be capable of outputting data "x" to an external part in a t+4$^{th}$ cycle.

In this manner, assuming that the number of the resources of the processing unit is large enough, the resources are assigned so that the operations indicated by the instruction information and made parallel as much as possible are executed in the same processing cycle, which greatly increases the processing speed of the processing unit. However, when the operating speed of the input interface unit and the output interface unit is comparatively slow, there is a possibility that the processing speed of the processing unit is excessively high. The processing speed of the processing unit may be slow, providing that it falls within a range satisfying a throughput of the processing device.

Figure 4:
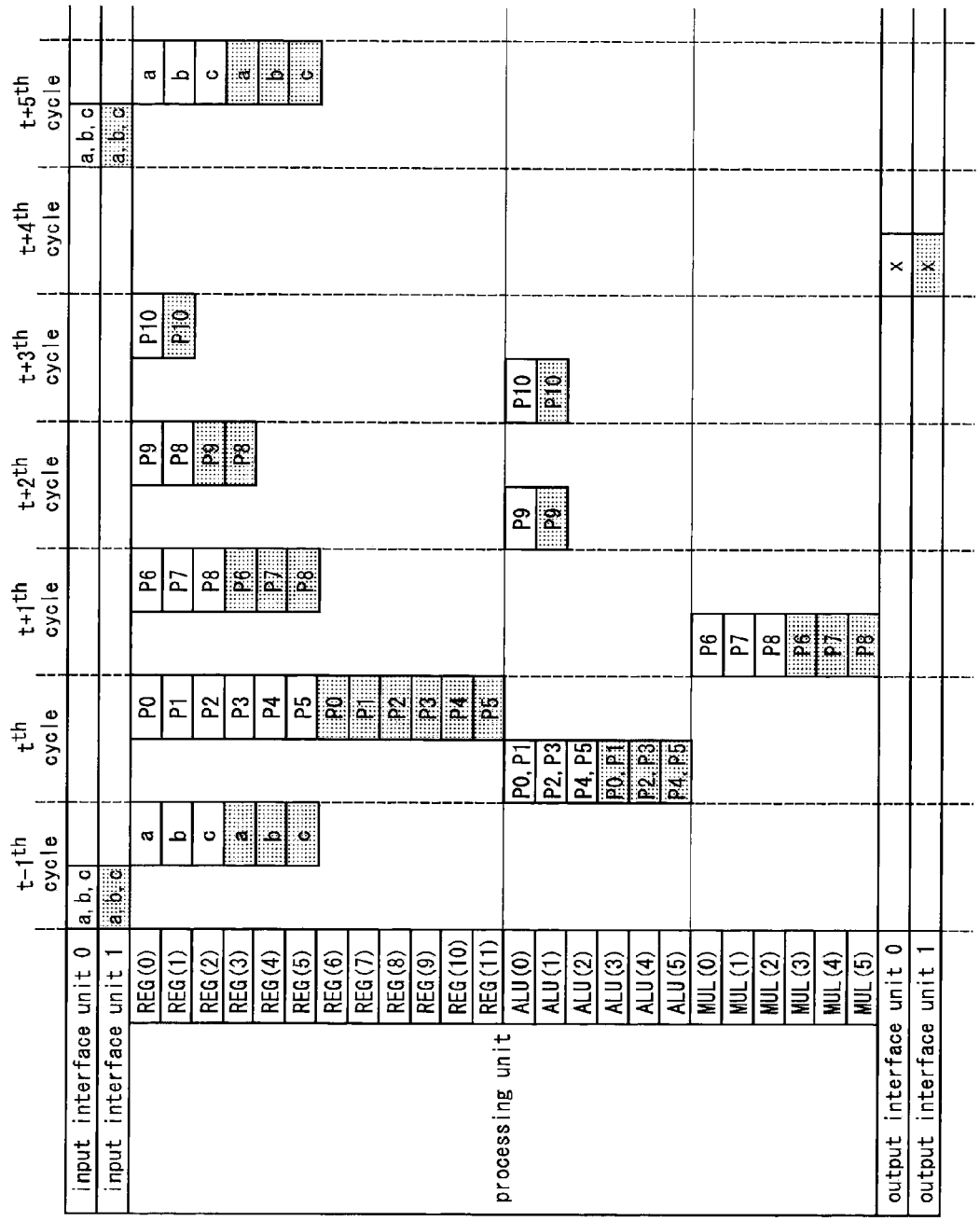
FIG. 4 is an explanatory chart (1) showing a basic concept of resource assignment to operations in the present invention.
Figure 5:
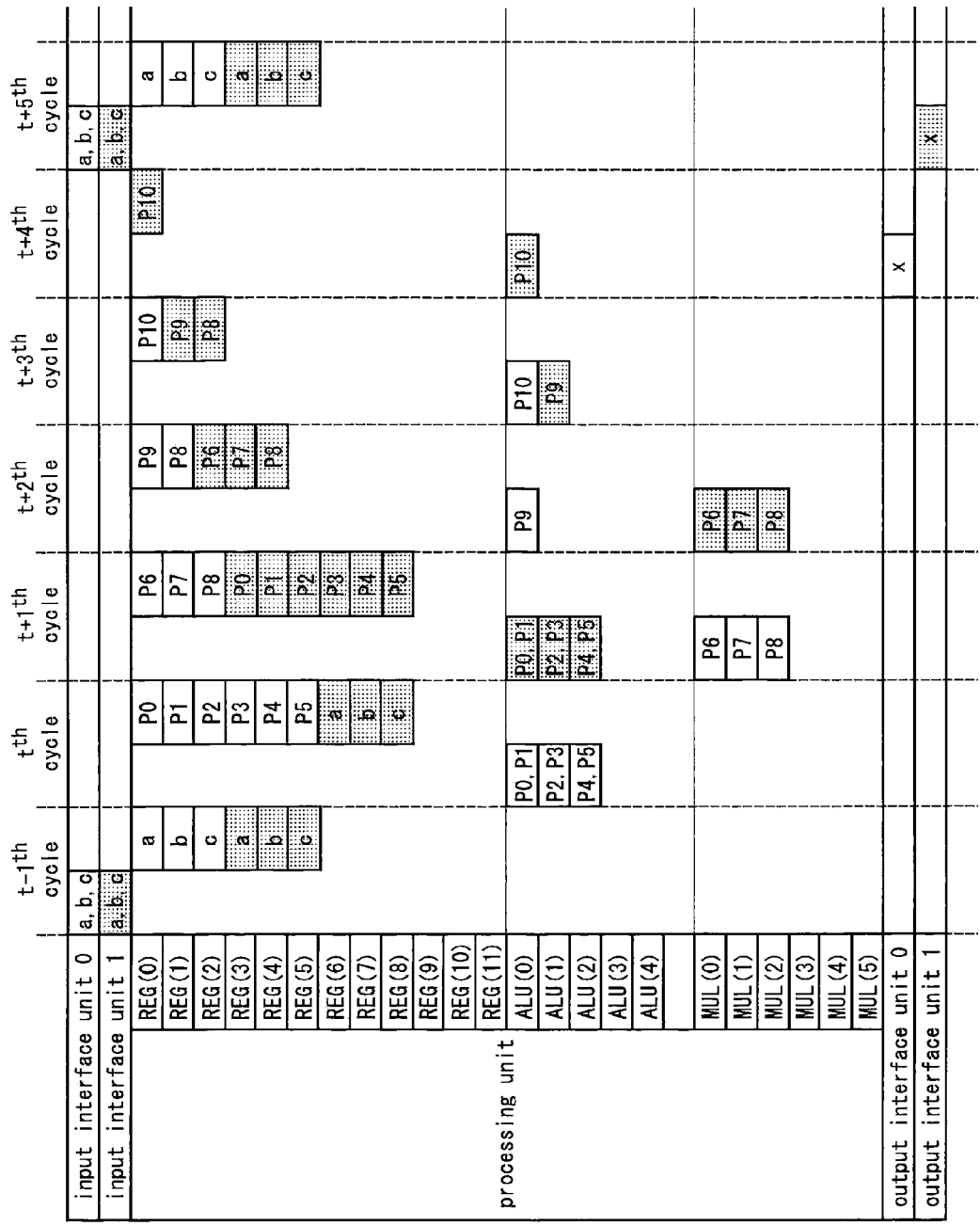
FIG. 5 is an explanatory chart (2) showing a basic concept of resource assignment to operations in the present invention.

FIG. 4 and FIG. 5 show basic concepts of the resource assignment to operations in the present invention. It is assumed that two arithmetic processings on data series 0, 1 are executed in the processing unit. As an example, the following description will be on a case where the two arithmetic processings are both the same as the arithmetic processing in FIG. 2(a) and resources are assigned to the operations indicated by the instruction information generated from the program in FIG. 2(d). The number of the resources (the number of REG, the number of ALU, and the number of MUL) of the processing unit is assumed to be large enough. ALU is assumed to have functions of both an adder and a subtracter. Further, it is assumed that, in a t−1$^{th}$ cycle, external input data "a", "b", "c" externally supplied to an input interface unit 0 corresponding to the series 0 are stored in REG (0), REG (1), REG (2) and data "a", "b", "c" externally supplied to an input interface unit 1 corresponding to the series 1 are stored in REG (3), REG (4), REG (5). Further, it is assumed that the execution of the arithmetic processing on the series 0 is given a priority over the execution of the arithmetic processing on the series 1.

In such a case, as shown in FIG. 4, in a t$^{th}$ cycle, in order to execute Processes P0~P5 of the series 0, the resources are assigned in the same manner as in FIG. 3. Subsequently, in order to execute Processes P0, P1 of the series 1, REG (3) and REG (4) are commonly assigned as input origins of data to be processed, and ALU (3) is commonly assigned as an operator, and REG (6) and REG (7) are separately assigned as output destinations of processed data. In order to execute Processes P2, P3 of the series 1, REG (4) and REG (5) are commonly assigned as input origins of data to be processed, ALU (4) is commonly assigned as an operator, and REG (8) and REG (9) are separately assigned as output destinations of processed data. In order to execute Processes P4, P5 of the series 1, REG (5) and REG (3) are commonly assigned as input origins of data to be processed, ALU (5) is commonly assigned as an operator, and REG (10) and REG (11) are separately assigned as output destinations of processed data.

In a t+1$^{th}$ cycle, in order to execute Processes P6 P8 of the series 0, the resources are assigned in the same manner as in FIG. 3. Subsequently, in order to execute Process P6 of the series 1, REG (6) and REG (7) are commonly assigned as input origins of data to be processed, MUL (3) is assigned as an operator, and REG (3) is assigned as an output destination of processed data. In order to execute Process P7 of the series 1, REG (8) and REG (9) are assigned as input origins of data to be processed, MLU (4) is assigned as an operator, and REG (4) is assigned as an output destination of processed data. In order to execute Process P8 of the series 1, REG (10) and REG (11) are assigned as input origins of data to be processed, MUL (5) is assigned as an operator, and REG (5) is assigned as an output destination of processed data.

In a t+2$^{th}$ cycle, in order to execute Process 9 and the transfer of the processed data of Process P8 of the series 0, the resources are assigned in the same manner as in FIG. 3. Subsequently, in order to execute Process P9 of the series 1, REG (3) and REG (4) are assigned as input origins of data to be processed, ALU (1) is assigned as an operator, and REG (2) is assigned as an output destination of processed data. In order to execute the transfer of the processed data of Process P8 of the series 1, REG (5) is assigned as a transfer origin and REG (3) is assigned as a transfer destination.

In a t+3$^{th}$ cycle, in order to execute Process P10 of the series 0, the resources are assigned in the same manner as in FIG. 3. Subsequently, in order to execute Process P10 of the series 1, REG (2) and REG (3) are assigned as input origins of data to be processed, ALU (1) is assigned as an operator, and REG (1) is assigned as an output destination of processed data. Consequently, the output interface unit 0 corresponding to the series 0 comes to be capable of outputting data "x" to an external part in a t+4$^{th}$ cycle. Further, an output interface unit 1 corresponding to the series 1 also comes to be capable of outputting data "x" to an external part in the t+4$^{th}$ cycle As described above, supposing that the number of the resources of the processing unit is large enough, it is possible to execute the two arithmetic processings at the highest speed by using a large number of the resources. However, according to this resource assignment, a large number of the resources are used instantaneously (only at the t$^{th}$ cycle), and not many of the resources are used in the other periods, which implies that a relatively excessive number of the resources are secured if the required throughput of the series 0, 1 of the processing device is low.

The following description will be on a case where the resources are assigned to the operations, assuming that, for example, the number of REG and the number of ALU, and the number of MUL are 12, 5, and 6 respectively. In such a case, as shown in FIG. 5, in the t$^{th}$ cycle, in order to execute Processes P0~P5 of the series 0, the resources are assigned in the same manner as in FIG. 3. In order to execute Processes P0~P5 of the series 1, the number of ALU required is 3, but the number of ALU left unassigned is only 2. Therefore, the processing cycle in which Processes P0~P5 of the series 1 are to be executed is changed to the subsequent cycle (the t+1$^{th}$ cycle). The reason why not only Processes P4, P5 but also Processes P0~P3 are shifted to the subsequent processing cycle is to facilitate hardware design. In this event, the data "a", "b", "c" stored in REG (3), REG (4), REG (5) respectively have to be evacuated therefrom, for later use in the subsequent cycle. Therefore, REG (3) is assigned as a transfer origin and REG (6) is assigned as a transfer destination for the evacuation of the data "a" stored in REG (3). REG (4) is assigned as a transfer origin and REG (7) is assigned as a transfer destination for the evacuation of the data "b" stored in REG (4). REG (5) is assigned as a transfer origin and REG (8) is assigned as a transfer destination for the evacuation of the data "c" stored in REG (5).

In the t+1$^{th}$ cycle, in order to execute Processes P6~P8 of the series 0, the resources are assigned in the same manner as in FIG. 3. Subsequently, in order to execute Processes P0, P1 of the series 1 which should have been executed in the t$^{th}$ cycle, REG (6) and REG (7) are commonly assigned as input origins of the data to be processed, and ALU (0) is commonly assigned as an operator, REG (3) and REG (4) are separately assigned as output destinations of the processed data. In order to execute Processes P2, P3 of the series 1 which should have been executed in the t$^{th}$ cycle, REG (7) and REG (8) are commonly assigned as input origins of the data to be processed, ALU (1) is commonly assigned as an operator, and REG (5) and REG (6) are separately assigned as output destinations of the processed data. In order to execute Processes P4, P5 of the series 1 which should have been executed in the $t^{th}$ cycle, REG (8) and REG (6) are commonly assigned as input origins of the data to be processed, ALU (2) is commonly assigned as an operator, and REG (7) and REG (8) are separately assigned as output destinations of the processed data.

In the $t+2^{th}$ cycle, in order to execute Process P9 and the transfer of the processed data of Process P8 of the series 0, the resources are assigned in the same manner as in FIG. 3. Subsequently, in order to execute Process P6 of the series 1 which should have been executed in the $t+1^{th}$ cycle, REG (3) and REG (4) are assigned as input origins of the data to be processed, MUL (0) is assigned as an operator, and REG (2) is assigned as an output destination of the processed data. In order to execute Process P7 of the series 1 which should have been executed in the $t+1^{th}$ cycle, REG (5) and REG (6) are assigned as input origins of the data to be processed, MUL (1) is assigned as an operator, and REG (3) is assigned as an output destination of the processed data. In order to execute Process P8 of the series 1 which should have been executed in the $t+1^{th}$ cycle, REG (7) and REG (8) are assigned as input origins of the data to be processed, MUL (2) is assigned as an operator, and REG (4) is assigned as an output destination of the processed data.

In the $t+3^{th}$ cycle, in order to execute Process P10 of the series 0, the resources are assigned in the same manner as in FIG. 3. Consequently, the output interface unit 0 corresponding to the series 0 comes to be capable of outputting the data "x" to the external part in the $t+4^{th}$ cycle. Subsequently, in order to execute Process P9 of the series 1 which should have been executed in the $t+2^{th}$ cycle, REG (2) and REG (3) are assigned as input origins of the data to be processed, ALU (1) is assigned as an operator, and REG (1) is assigned as an output destination of the processed data. In order to execute the transfer of the processed data of Process P8 of the series 1 which should have been executed in the $t+2^{th}$ cycle, REG (4) is assigned as a transfer origin, and REG (2) is assigned as a transfer destination of the processed data.

In the $t+4^{th}$ cycle, in order to execute Process P10 of the series 1 which should have been executed in the $t+3^{th}$ cycle, REG (1) and REG (2) are assigned as input origins of the data to be processed, ALU (0) is assigned as an operator, and REG (0) is assigned as an output destination of the processed data. Consequently, the output interface unit 1 corresponding to the series 1 comes to be capable of outputting the data "x" to the external part in a $t+5^{th}$ cycle.

In such a case, since Processes P4, P5 of the series 1 cannot be executed in the $t^{th}$ cycle, Processes P4, P5 of the series 1 are shifted to the $t+1^{th}$ cycle together with Processes P0~P3. Accordingly, Processes P6~P10 of the series 1 are shifted to the immediately subsequent cycle. As a result, the output interface unit 1 corresponding to the series 1 comes to be capable of outputting the data "x" to the external part not in the $t+4^{th}$ cycle but in the $t+5^{th}$ cycle, which does not pose any problem, providing that the data output timing required for the output interface 1 of the series 1 is the $t+5^{th}$ cycle. Specifically, even when the data are externally inputted at constant time intervals (6-cycle period), such as being inputted in the $t-1^{th}$ cycle, the $t+5^{th}$ cycle, and a $t+11^{th}$ cycle (not shown), the result of the series 0 can be outputted in $t+4^{th}$ cycle, a $t+10^{th}$ cycle (not shown), and a $t+16^{th}$ cycle (not shown), and the result of the series 1 can be outputted in the $t+5^{th}$ cycle, the $t+11^{th}$ cycle (not shown), and a $t+17^{th}$ cycle (not shown). That is, in a case where an output time interval satisfying a desired throughput is equal to an input time interval (6 cycles) of the data from the external part, this can be satisfied. Therefore, it is possible to reduce the number of the resources (ALU) while maintaining the throughput of the processing device. In this example, not only the number of ALU but also the number of REG and MUL can be reduced. The present invention was made on the basis of the above-described basic concepts.

Figure 6:
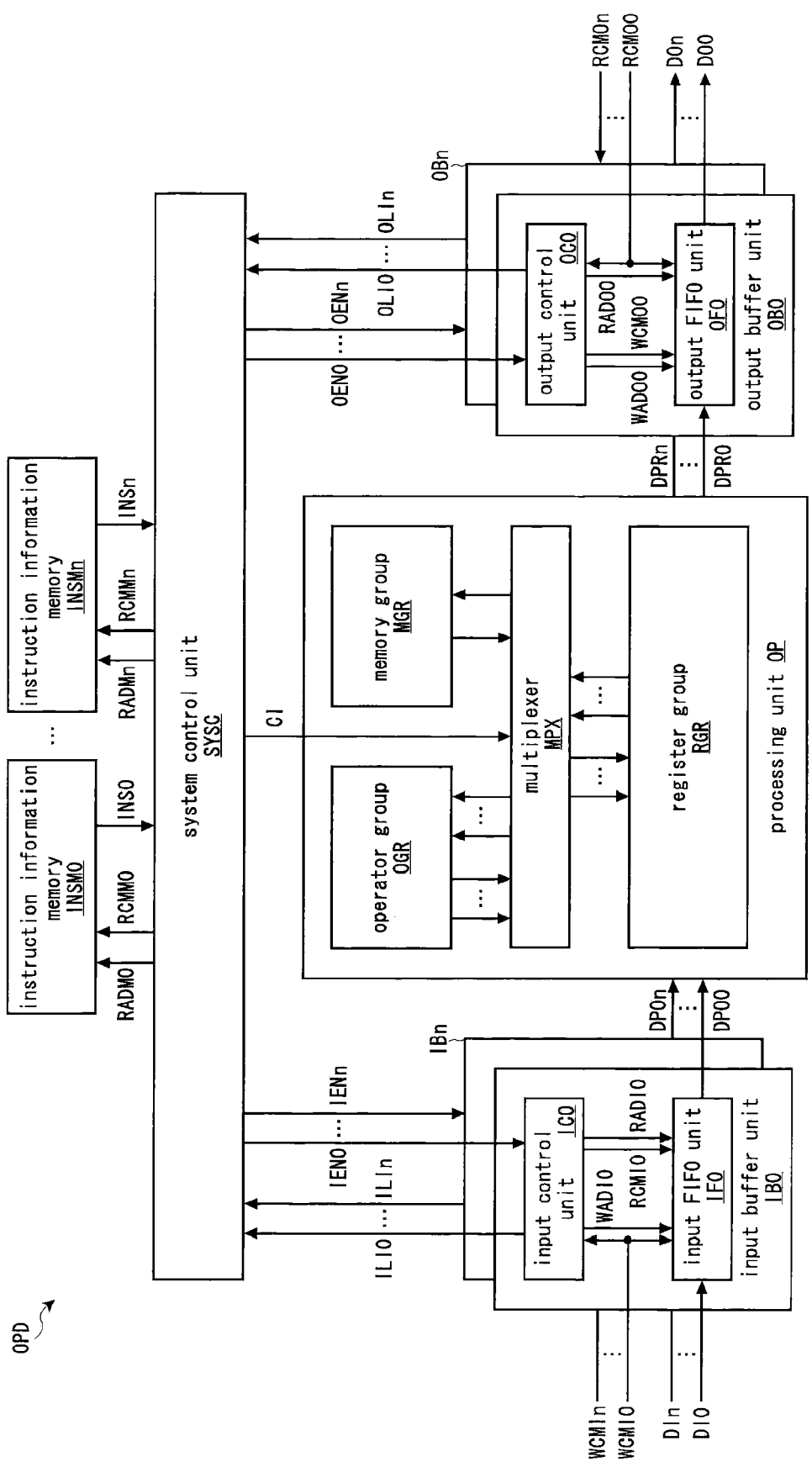
FIG. 6 is a block diagram showing an embodiment of the present invention.
Figure 7:
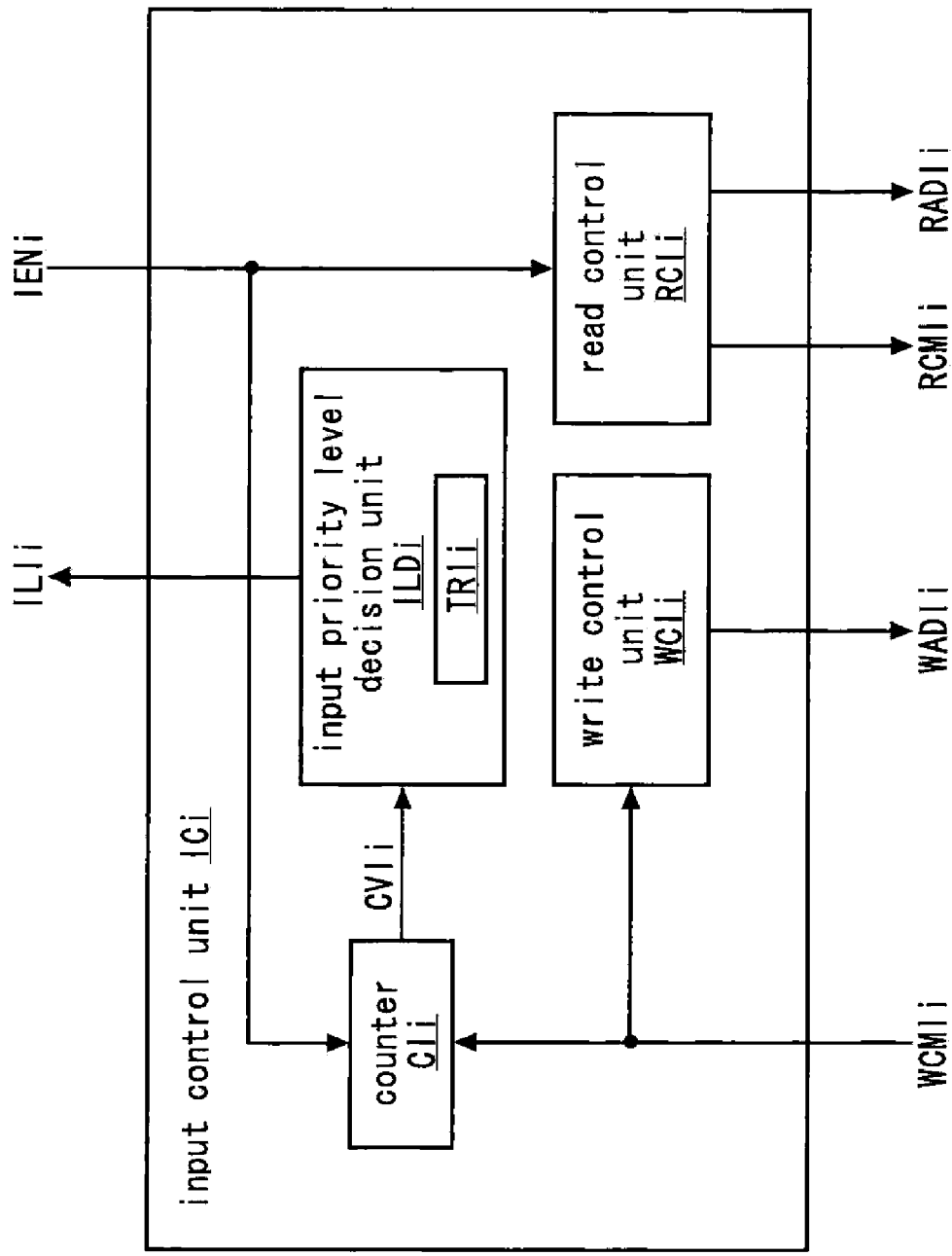
FIG. 7 is a block diagram showing details of an input control unit in FIG. 6.
Figure 8:
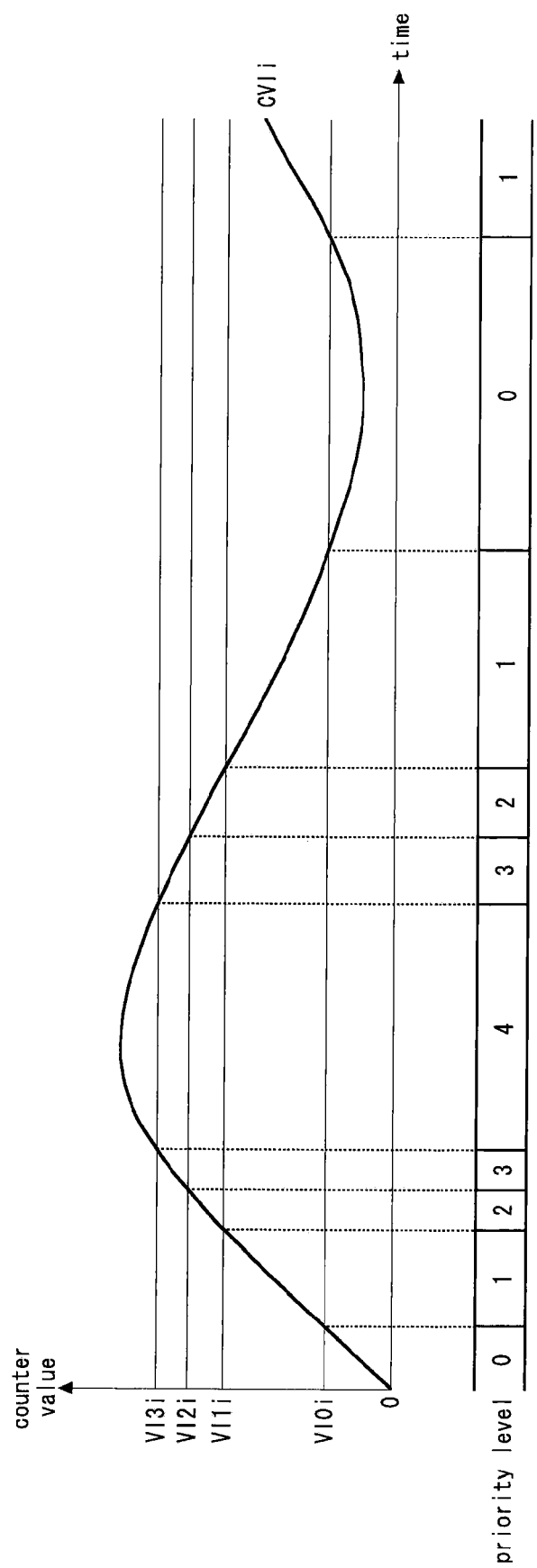
FIG. 8 is an explanatory chart showing an example of an operation of an input priority level decision unit in FIG. 7.
Figure 9:
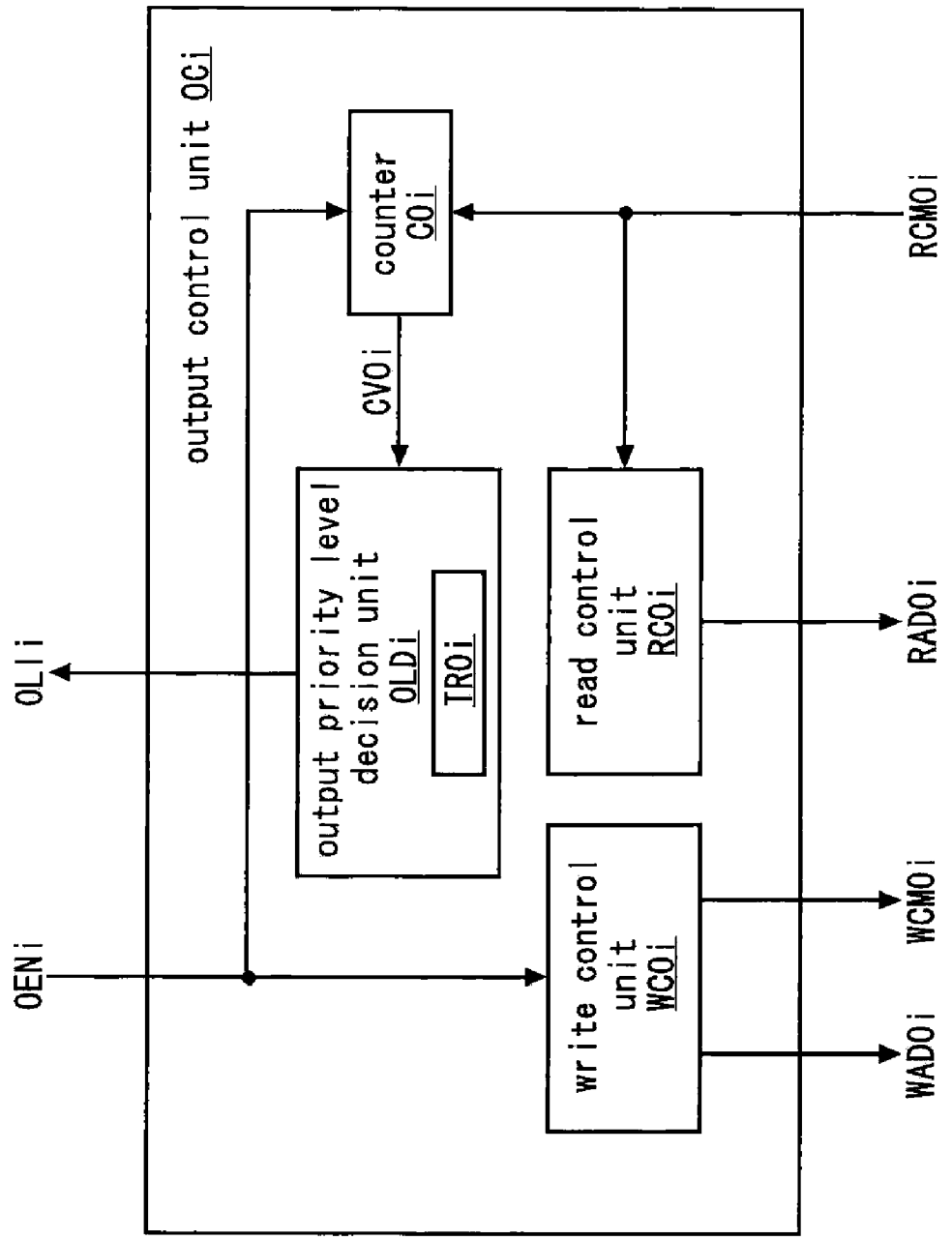
FIG. 9 is a block diagram showing details of an output control unit in FIG. 6.
Figure 10:
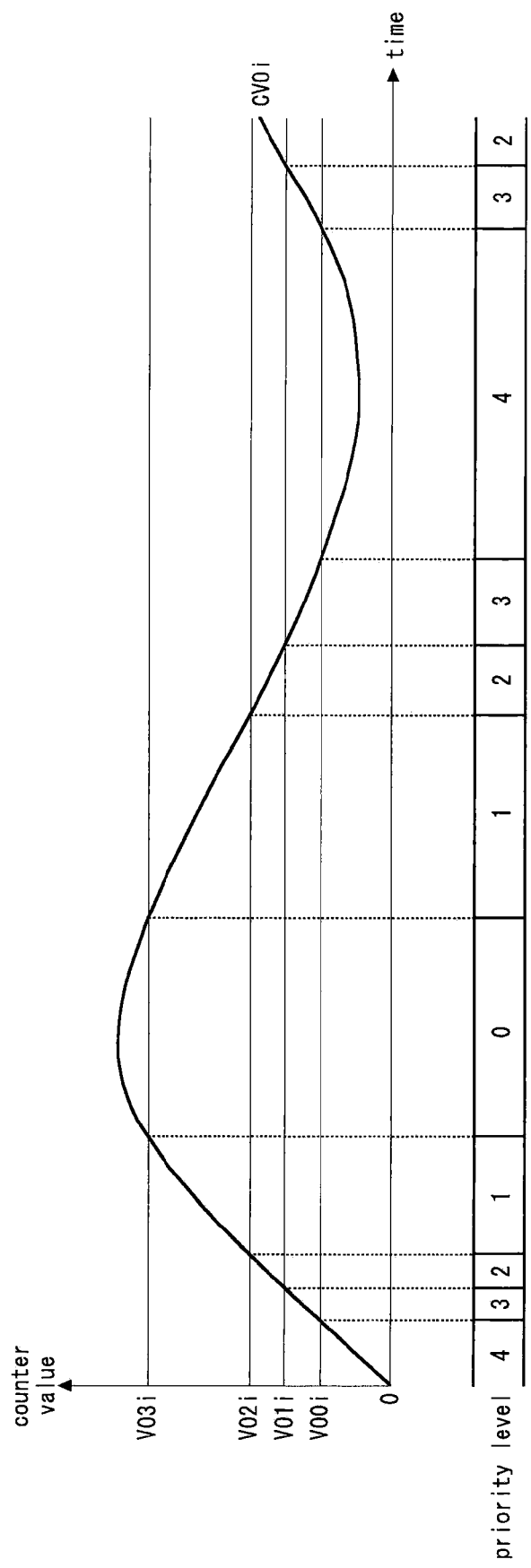
FIG. 10 is an explanatory chart showing an example of an operation of an output priority level decision unit in FIG. 9.
Figure 11:
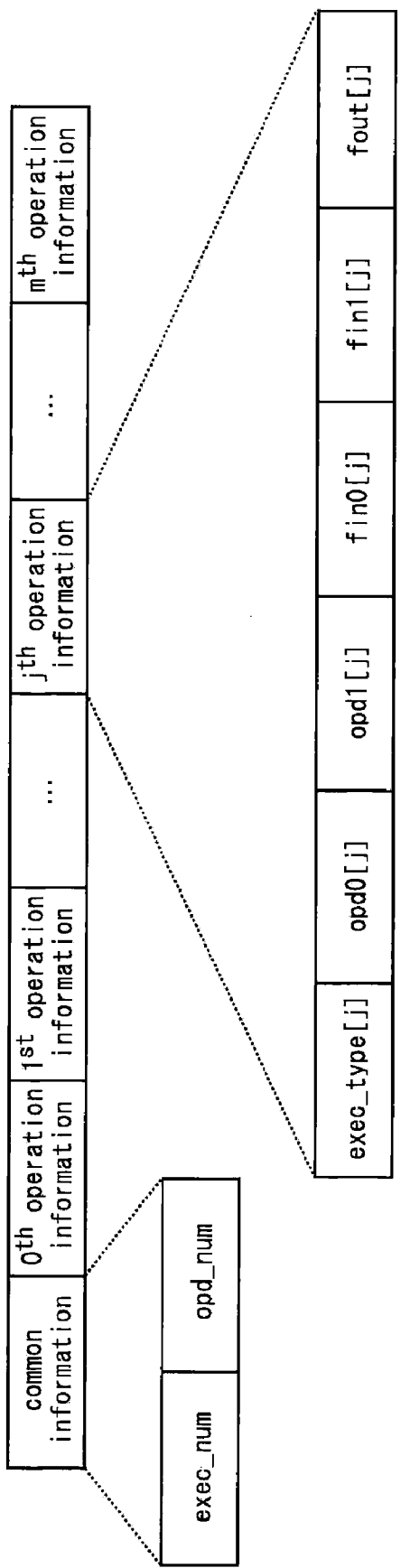
FIG. 11 is an explanatory chart showing an overview of instruction information stored in instruction information memories in FIG. 6.
Figure 13:
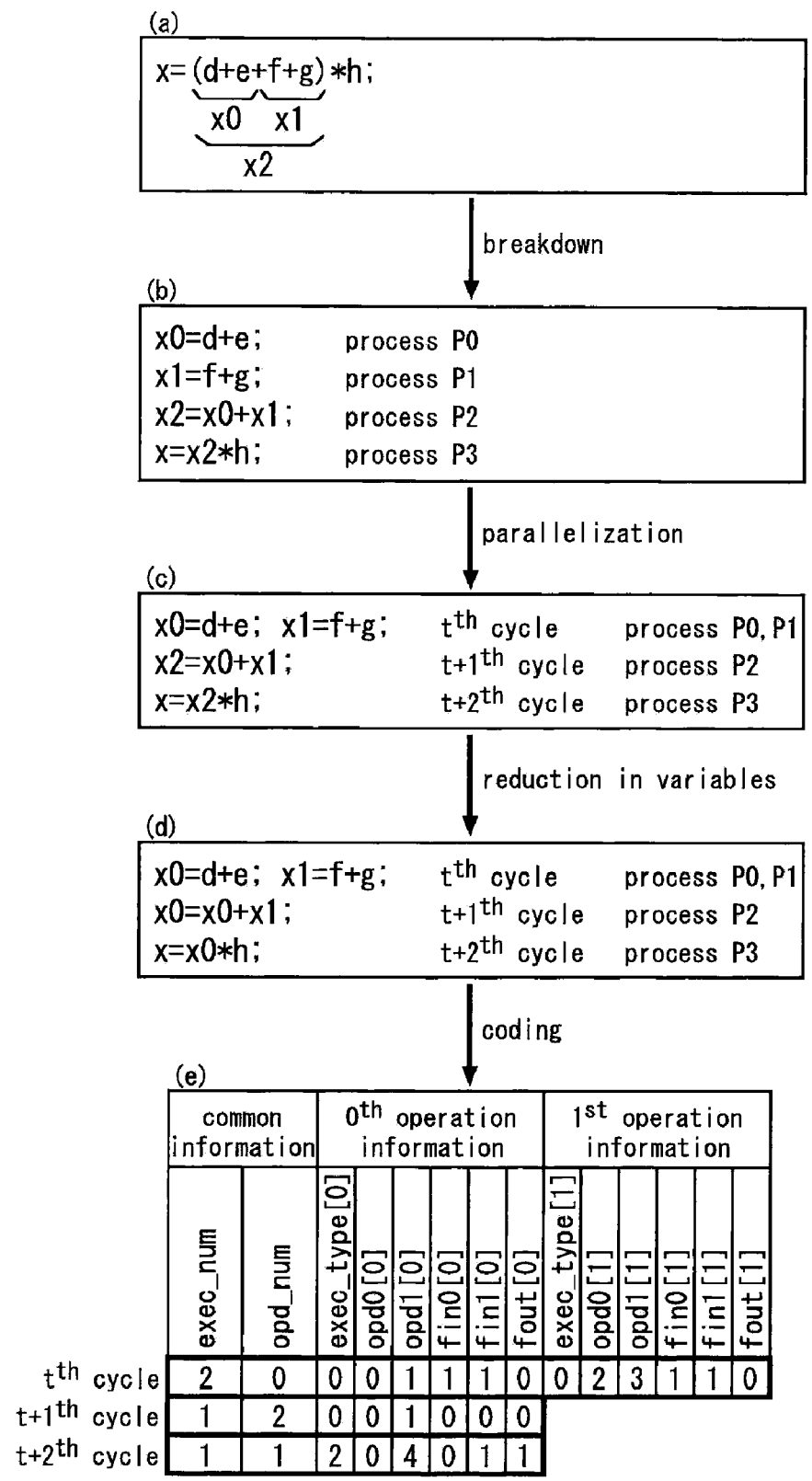
FIG. 13 is an explanatory chart showing another concrete example of the instruction information stored in the instruction information memories in FIG. 6.
Figure 14:
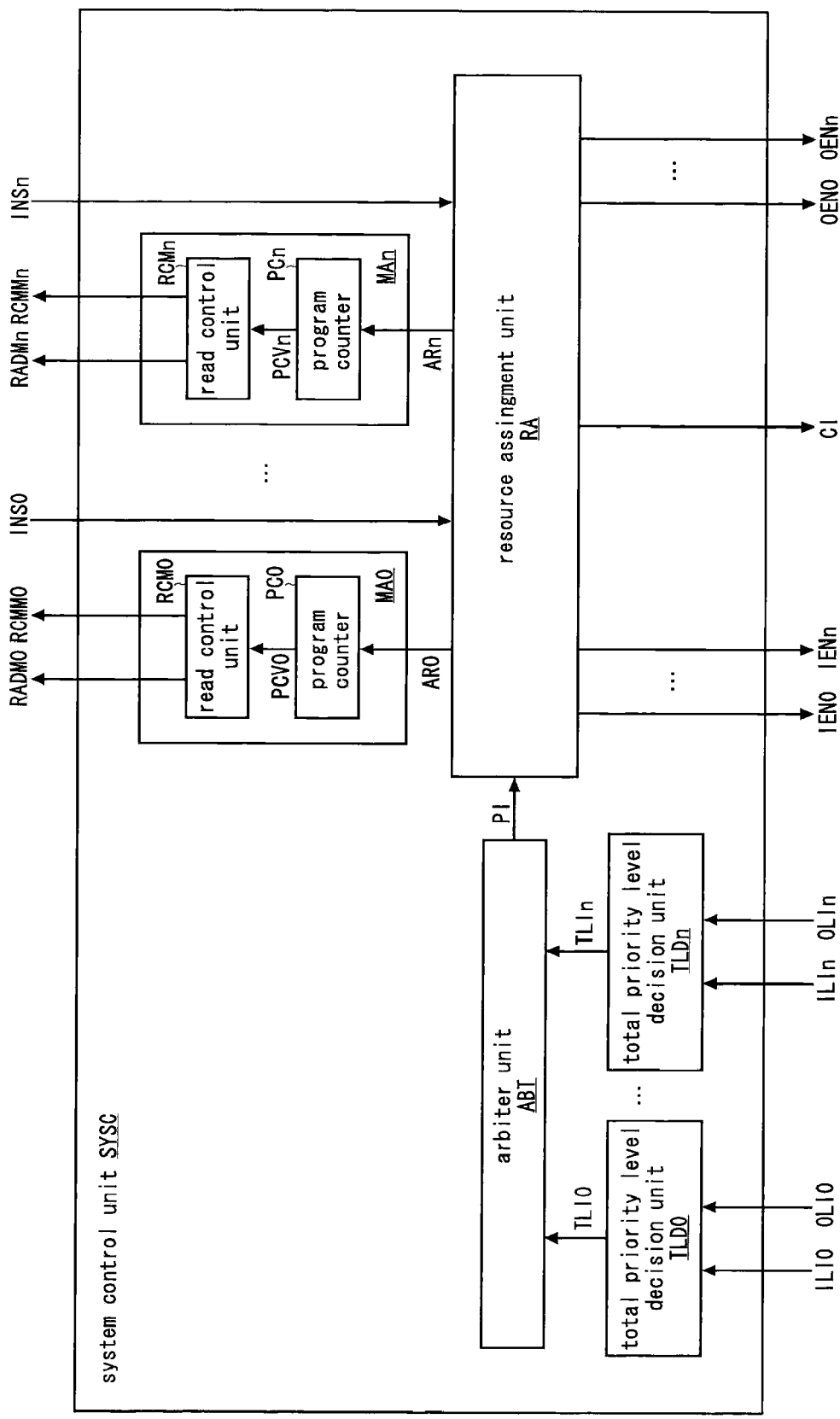
FIG. 14 is a block diagram showing details of a system control unit in FIG. 6.
Figure 17:
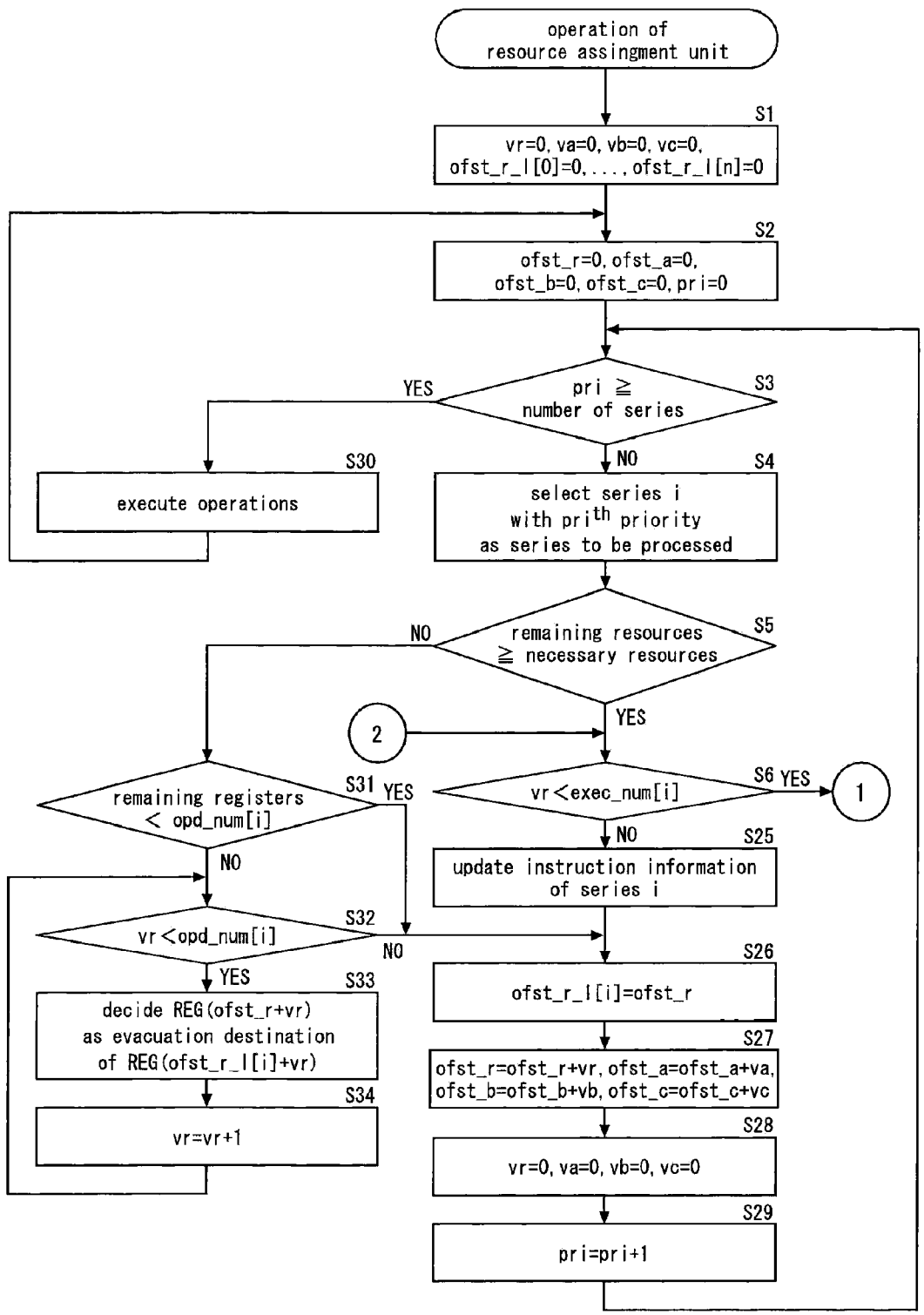
FIG. 17 is a flowchart (1) showing operations of the resource assignment unit in FIG. 14.
Figure 18:
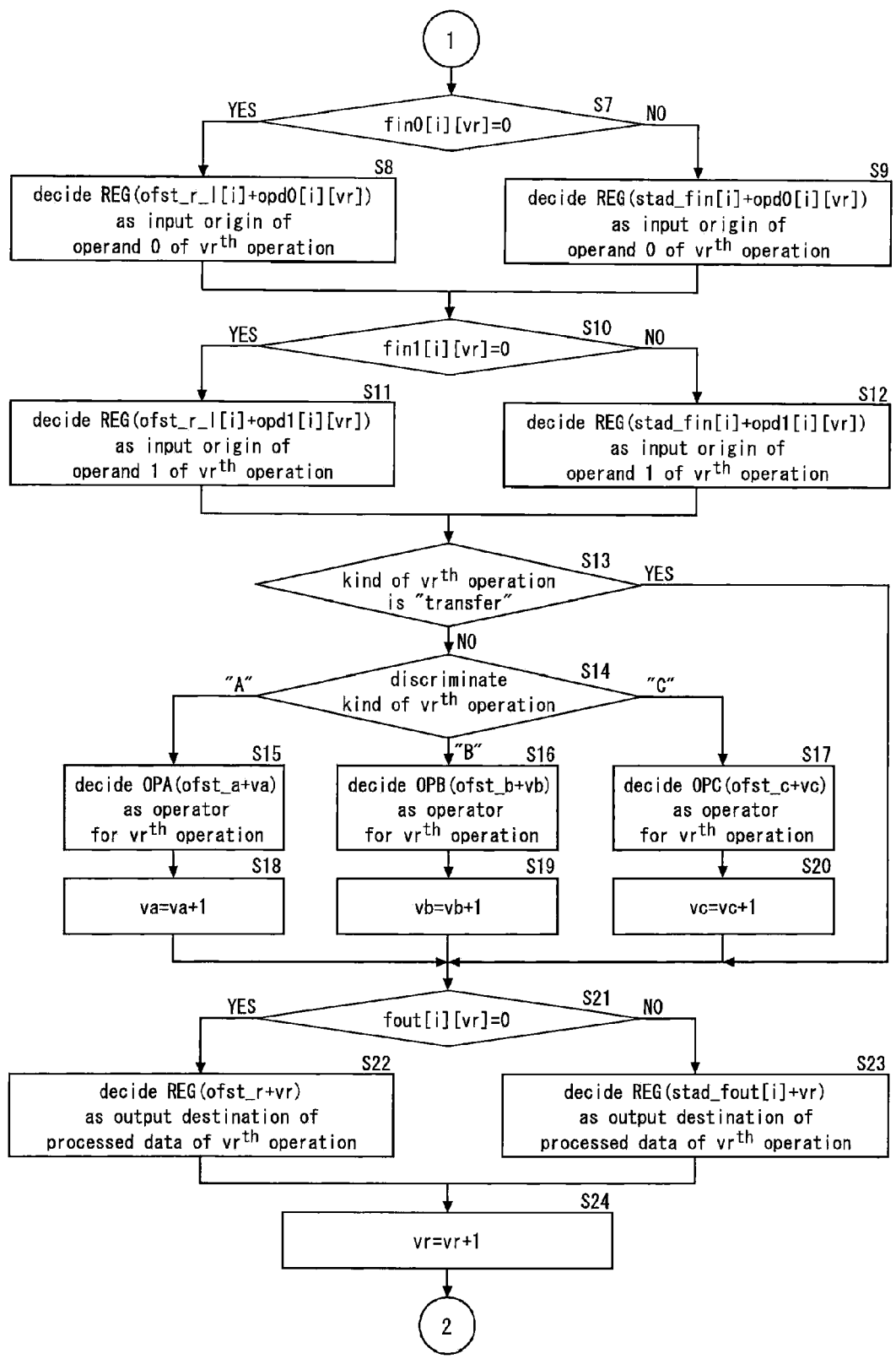
FIG. 18 is a flowchart (2) showing operations of the resource assignment unit in FIG. 14.

Hereinafter, an embodiment of the present invention will be described, using the drawings. FIG. 6 shows one embodiment of the present invention. FIG. 7 shows details of an input control unit in FIG. 6. FIG. 8 shows an example of an operation of an input priority level decision unit in FIG. 7. FIG. 9 shows details of an output control unit in FIG. 6. FIG. 10 shows an example of an operation of an output priority level decision unit in FIG. 9. FIG. 11 shows an overview of instruction information stored in instruction information memories in FIG. 6. FIG. 12 shows a concrete example of the instruction information stored in the instruction information memories in FIG. 6. FIG. 13 shows another concrete example of the instruction information stored in the instruction information memories in FIG. 6. FIG. 14 shows details of a system control unit in FIG. 6. FIG. 15 shows a concrete example of a priority level definition table used in a total priority level decision unit in FIG. 14. FIG. 16 shows internal variables used in a resource assignment unit in FIG. 14. FIG. 17 and FIG. 18 show operations of the resource assignment unit in FIG. 14.

As shown in FIG. 6, a processing device OPD has input buffer units IB0~IBn (n: an integer equal to 1 or larger), a processing unit OP, output buffer units OB0~OBn, instruction information memories INSM0 to INSMn, and a system control unit SYSC.

The input buffer unit IBi (i=0, . . . , n) is provided in correspondence with a series i. The input buffer unit IBi has an input FIFO unit IFi and an input control unit ICi. In response to an externally supplied write command WCMIi, the input FIFO unit IFi stores externally supplied external input data DIi, in an address indicated by a write address WADIi supplied from the input control unit ICi. As data to be processed DPOi, the input FIFO unit IFi outputs to the processing unit OP external input data stored in an address indicated by a read address RADIi supplied from the input control unit ICi, in response to a read command RCMIi supplied from the input control unit ICi.

As shown in FIG. 7, the input control unit ICi has a write control unit WCIi, a read control unit RCIi, a counter CIi, and an input priority level decision unit ILDi. The write control unit WCIi outputs the write address WADIi to the input FIFO unit IFi in response to the externally supplied write command WCMIi. The read control unit RCIi outputs the read command RCMIi and the read address RADIi to the input FIFO unit IFi in response to an input enable notification IENi supplied from the system control unit SYSC. The counter CIi counts up in response to the write command WCMIi, while counting down in response to the input enable notification IENi. That is, a counter value CVIi of the counter CIi increments in response to the write command WCMIi, while decrementing in response to the input enable notification IENi. Therefore, the counter value CVIi of the counter CIi corresponds to a data storage amount of the input FIFO unit IFi. The counter CIi outputs the counter value CVIi to the input priority level decision unit ILDi.

The input priority level decision unit ILDi has a threshold value register TRIi in which threshold values VI0i~VI3i (VI0i<VI1i<VI2i<VI3i) are set by software. The input priority level decision unit ILDi compares the counter value CVIi supplied from the counter CIi with the threshold values VI0$i$~VI3$i$ set in the threshold value register TRIi to decide priority level and outputs input priority level information ILIi indicating the decided priority level to the system control unit SYSC. For example, as shown in FIG. 8, the input priority level decision unit ILDi decides the priority level as "0" when the counter value CVIi is smaller than the threshold value VI0$i$. The input priority level decision unit ILDi decides the priority level as "1" when the counter value CVIi is not smaller than the threshold value VI0$i$ and smaller than the threshold value VI1$i$. The input priority level decision unit ILDi decides the priority level as "2" when the counter value CVIi is not smaller than the threshold value VI1$i$ and smaller than the threshold value VI2$i$. The input priority level decision unit ILDi decides the priority level as "3" when the counter value CVIi is not smaller than the threshold value VI2$i$ and smaller than the threshold value VI3$i$. The input priority level decision unit ILDi decides the priority level as "4" when the counter value CVIi is equal to the threshold value VI3$i$ or larger. Thus, the input priority level decision unit ILDi decides the priority level as higher as the counter value CVIi of the counter CIi is larger. In other words, the input priority level decision unit ILDi decides the priority level as higher as the data storage amount of the input FIFO unit IFi is larger.

As shown in FIG. 6, the processing unit OP has a register group RGR, an operator group OGR, a memory group MGR, and a multiplexer MPX. The register group RGR includes a plurality of registers REG. The operator group OGR includes a plurality of operators OPA for executing "operation A", a plurality of operators for executing "operation B", and a plurality of operators OPC for executing "operation C". For example, the operators OPA, OPB, OPC are two-input one-output operators. The memory group MGR includes a plurality of memories MEM. The multiplexer MPX changes connection relation of the registers REG in the register group RGR, the operators OPA, OPB, OPC in the operator group OGR, and the memories MEM in the memory group MGR, based on connection information CI supplied from the system control unit SYSC. The processing unit OP as described above changes an internal configuration according to the connection information CI to execute series i arithmetic processing on the data to be processed DPOi supplied from the input buffer unit IBi and to output processed data DPRi to the output buffer unit OBi.

The output buffer unit OBi is provided in correspondence with the series i. The output buffer unit OBi has an output FIFO unit OFi and an output control unit OCi. In response to a write command WCMOi supplied from the output control unit OCi, the output FIFO unit OFi stores the processed data DPRi, which is supplied from the processing unit OP, in an address indicated by a write address WADOi supplied from the output control unit OCi. As external output data DOi, the output FIFO unit OFi outputs to an external part the processed data stored in the address indicated by a read address RADOi supplied from the output control unit OCi, in response to an externally supplied read command RCMOi, As shown in FIG. 9, the output control unit OCi has a write control unit WCOi, a read control unit RCOi, a counter COi, and an output priority level decision unit OLDi. The write control unit WCOi outputs the write command WCMOi and the write address WADOi to the output FIFO unit OFi in response to an output enable notification OENi supplied from the system control unit SYSC. The read control unit RCOi outputs the read address RADOi to the output FIFO unit OFi in response to the externally supplied read command RCMOi. The counter COi counts up in response to the output enable notification OENi, while counting down in response to the read command RCMOi. That is, a counter value CVOi of the counter COi increments in response to the output enable notification OENi, while decrementing in response to the read command RCMOi. Therefore, the counter value CVOi of the counter COi corresponds to a data storage amount of the output FIFO unit OFi. The counter COi outputs the counter value CVOi to the output priority level decision unit OLDi.

The output priority level decision unit OLDi has a threshold value register TROi in which threshold values VO0$i$~VO3$i$ (VO0$i$<VO1$i$<VO2$i$<VO3$i$) are set by software. The output priority level decision unit OLDi compares the counter value CVOi supplied from the counter COi with the threshold values VO0$i$ to VO3$i$ set in the threshold value register TROi to decide priority level and outputs output priority level information OLIi indicating the decided priority level to the system control unit SYSC. For example, as shown in FIG. 10, the output priority level decision unit OLDi decides the priority level as "4" when the counter value VO0$i$ is smaller than the threshold value VO0$i$. The output priority level decision unit OLDi decides the priority level as "3" when the counter value CVOi is not smaller than the threshold value VO0$i$ and smaller than the threshold value VO1$i$. The output priority level decision unit OLDi decides the priority level as "2" when the counter value CVOi is not smaller than the threshold value VO1$i$ and smaller than the threshold value VO2$i$. The output priority level decision unit OLDi decides the priority level as "1" when the counter value CVOi is not smaller than the threshold value VO2$i$ and smaller than VO3$i$. The output priority level decision unit OLDi decides the priority level as "0" when the counter value CVOi is equal to the threshold value VO3$i$ or larger. In this manner, the output priority level decision unit OLDi decides the priority level as lower as the counter value CVOi of the counter COi is larger. In other words, the output priority level decision unit OLDi decides the priority level as lower as a data storage amount of the output FIFO unit OFi is larger.

As shown in FIG. 6, the instruction information memory INSMi is provided in correspondence with the series i. The instruction information memory INSMi stores a plurality of pieces of instruction information generated as a result of the compilation of a processing program for the series i. In response to a read command RCMMi supplied from the system control unit SYSC, the instruction information memory INSMi selects the instruction information stored in an address indicated by a read address RADMi supplied from the system control unit SYSC, as instruction information INSi to be supplied to the system control unit SYSC.

For example, as shown in FIG. 11, the instruction information stored in the instruction information memory INSMi includes common information and m+1 pieces (m: an integer equal to or larger than 0) of operation information. The common information has exec_num and opd_num as fields. exec_num is a field representing the number of operations in each processing cycle. opd_num is a field representing the number of operands whose input origins are the registers REG of the processing unit OP (the register group RGR).

$j^{th}$ operation information has exec_type[j], opd0[j], opd1[j], fin0[j], fin1[j], and fout[j] as fields. exec_type[j] is a field representing the kind of a $j^{th}$ operation. For example, when the kind of the $j^{th}$ operation is "addition", exec_type[j] is set to "0". When the kind of the $j^{th}$ operation is "subtraction", exec_type[j] is set to "1". When the kind of the $j^{th}$ operation is "multiplication", exec_type[j] is set to "2". When the kind of the $j^{th}$ operation is "transfer", exec_type[j] is set to "3". opd0[j] is a field representing the identification number of an operand 0 of the $j^{th}$ operation (one of the two data to be processed used in the $j^{th}$ operation). opd1[j] is a field representing the identification number of an operand 1 of the $j^{th}$ operation (the other of the two data to be processed used in the $j^{th}$ operation).

fin0[j] is a field representing a storage place of the operand 0 of the $j^{th}$ operation. For example, when the storage place of the operand 0 of the $j^{th}$ operation is the register REG of the processing unit OP, fin0[j] is set to "0". When the storage place of the operand 0 of the $j^{th}$ operation is the input FIFO unit IFi of the input buffer unit IBi, fin0[j] is set to "1". fin1[j] is a field representing a storage place of the operand 1 of the $j^{th}$ operation. For example, similarly to fin0[j], when the storage place of the operand 1 of the $j^{th}$ operation is the register REG of the processing unit OP, fin1[j] is set to "0". When the storage place of the operand 1 of the $j^{th}$ operation is the input FIFO unit IFi of the input buffer unit IBi, fin1[j] is set to "1". fout[j] is a field representing a storage place of processed data of the $j^{th}$ operation. For example, when the storage place of the processed data of the $j^{th}$ operation is the register REG of the processing unit OP, fout[j] is set to "0". When the storage place of the processed data of the $j^{th}$ operation is the output FIFO unit OFi of the output buffer unit OBi, fout[j] is set to "1". For example, as a result of compiling the processing program in FIG. 2(*a*), the instruction information shown in FIG. 12 is generated. Further, as a result of compiling a processing program in FIG. 13(*a*), instruction information shown in FIG. 13(*e*) is obtained.

As shown in FIG. 14, the system control unit SYSC has total priority level decision units TLD0 to TLDn, an arbiter unit ABT, memory access units MA0 to MAn, and a resource assignment unit RA. The total priority level decision unit TLDi is provided in correspondence with the series i. Upon receiving the input priority level information ILIi supplied from the input buffer unit IBi and the output priority level information OLIi supplied from the output buffer unit OBi, the total priority level decision unit TLDi refers to a priority level definition table to decide priority level and outputs total priority level information TLIi indicating the decided priority level to the arbiter unit ABT. For example, when the priority level indicated by the input priority level information IPLi is "a" (a=0, 1, . . . , 4) and the priority level indicated by the output priority level information OPLi is "b" (b=0, 1, . . . , 4), the total priority level decision unit TLDi decides the priority level as "a+b" by referring to the priority level definition table shown in FIG. 15 to output the total priority level information TLIi indicating "a+b" to the arbiter unit ABT.

As shown in FIG. 14, the arbiter unit ABT decides a priority sequence of the series 0~n based on the total priority level information TLI0~TLIn supplied from the total priority level decision units TLD0~TLDn respectively, and outputs priority sequence information PI indicating the decided priority sequence to the resource assignment unit RA. Concretely, in deciding the priority sequence of the series 0~n, the arbiter unit ABT decides the priority sequence as higher for the series whose priority level indicated by the corresponding total priority level information is higher.

The memory access unit MAi has a program counter PCi and a read control unit RCMi. The program counter PCi updates a counter value PCVi in response to an access request ARi supplied from the resource assignment unit RA. The program counter PCi outputs the counter value PCVi to the read control unit RCMi. In accordance with the change of the counter value PCVi supplied from the program counter PCi, the read control unit RCi outputs the read address RADMi corresponding to the counter value PCVi together with the read command RCMMi, to the instruction information memory INSMi.

Upon receiving the instruction information INS0~INSn supplied from the instruction information memories INSM0 to INSMn respectively and the priority sequence information PI supplied from the arbiter unit ABT, the resource assignment unit RA executes a later-described operation using internal variables to output the connection information CI, the input enable notifications IEN0~IENn, the output enable notifications OEN0~OENn, and the access requests AR0 to ARn at desired timings respectively.

The resource assignment unit RA has, as the internal variables, exec_num[i], opd_num[i], exec_type[i][j], opd0[i][j], opd1[i][j], fin0[i][j], fin1[i][j], fout0[i][j], vr, va, vb, vc, ofst_r, ofst_a, ofst_b, ofst_c, ofst_r_l[i], stad_fin[i], stad_fout [i], and pri, which are show in FIG. 16.

exec_num[i] and opd_num[i] are set to values of exec_num and opd_num in the common information in the instruction information INSi, respectively, when the instruction information INSi is supplied from the instruction information memory INSMi to the resource assignment unit RA. opd0[i][j], opd1[i][j], fin0[i][j], fin1[i][j], and fout[i][j] are set to values of opd0[j], opd1[j], fin0[j], fin1[j], and fout[j] respectively of the $j^{th}$ operation information in the instruction information INSi when the instruction information INSi is supplied from the instruction information memory INSMi to the resource assignment unit RA. That is, exec_num[i] is a variable representing the number of the operations in the series i. opd_num[i] is a variable representing the number of operands, in the series i, whose input origins are the registers REG of the processing unit OP. exec_type[i][j] is a variable representing the kind of the $j^{th}$ operation in the series i. opd0[i][j] is a variable representing the identification number of the operand 0 of the $j^{th}$ operation in the series i. opd1[i][j] is a variable representing the identification number of the operand 1 of the $j^{th}$ operation in the series i. fin0[i][j] is a variable representing the storage place of the operand 0 of the $j^{th}$ operation in the series i. fin1[i][j] is a variable representing the storage place of the operand 1 of the $j^{th}$ operation in the series 1. fout[i][j] is a variable representing the storage place of the processed data of the $j^{th}$ operation in the series i.

vr is a temporary variable for assignment of the registers REG. va is a temporary variable for assignment of the operators OPA. vb is a temporary variable for assignment of the operators OPB. vc is a temporary variable for assignment of the operators OPC. ofst_r is a variable representing an offset for assignment of the registers REG. ofst_a is a variable representing an offset for assignment of the operators OPA. ofst_b is a variable representing an offset for assignment of the operators OPB. ofst_c is a variable representing an offset for assignment of the operators OPC. ofst_r_l[i] is a variable representing an offset for assignment of the registers REG regarding the series i, in a preceding processing cycle. stad_fin[i] is a variable representing a read start address of the input FIFO unit IFi in the series i. stad_fout[li is a variable representing a write start address of the output FIFO unit OFi in the series i. pri is a variable representing the priority sequence number.

The resource assignment unit RA uses such internal variables to execute Steps S1~S34 shown in FIG. 17 and FIG. 18 as required.

At Step S1, the resource assignment unit RA makes the following setting: vr=0, va=0, vb=0, vc=0, and ofst_r_l[0]= 0, . . . , ofst_r_l[n]=0. The resource assignment unit RA executes this operation, for example, immediately after reset release of the processing device OPD. At the same time, the resource assignment unit RA outputs the access requests AR0~ARn to obtain the instruction information INS0~INSn indicating operations to be first executed in the series 0~n. Thereafter, the operation of the resource assignment unit RA shifts to Step S2.

At Step S2, the resource assignment unit RA makes the following setting: ofst_r=0, ofst_a=0, ofst_b=0, osft_c=0, and pri=0. Thereafter, the operation of the resource assignment unit RA shifts to Step S3.

At Step S3, the resource assignment unit RA judges whether or not the value of pri is equal to or larger than the number of the series (n+1) or larger. When the value of pri is equal to or larger than the number of the series, the operation of the resource assignment unit RA shifts to Step S30. When the value of pri is smaller than the number of the series, the operation of the resource assignment unit RA shifts to Step S4.

At Step S4, the resource assignment unit RA selects a series i with a $pri^{th}$ priority (the series i whose priority sequence is a "pri+1"$^{th}$ highest) as a series to be processed, based on the priority sequence of the series 0 to n indicated by the priority sequence information PI. Thereafter, the operation of the resource assignment unit RA shifts to Step S5.

At Step S5, the resource assignment unit RA judges whether or not the number of the remaining resources (the numbers of the unassigned registers REG, operators OPA, operators OPB, and operators OPC in the processing unit OP) is equal to or larger than the necessary number of the resources (the numbers of the registers REG, operators OPA, operators OPB, and operators OPC necessary for executing the operations indicated by the instruction information INSi). When the number of the remaining resources is equal to or larger than the necessary number of the resources, the operation of the resource assignment unit RA shifts to Step S6. When the number of the remaining resources is smaller than the necessary number of the resources, the operation of the resource assignment unit RA shifts to Step S31.

At Step S6, the resource assignment unit RA judges whether or not the value of vr is smaller than a value of exec_num[i]. When the value of vr is smaller than the value of exec_num[i], the operation of the resource assignment nit RA shifts to Step S7. When the value of vr is equal to or larger than the value of exec_num[i], the operation of the resource assignment unit RA shifts to Step S25.

At Step S7, the resource assignment unit RA judges whether or not a value of fin0[i][vr] is "0". When the value of fin0[i][vr] is "0", the operation of the resource assignment unit RA shifts to Step S8. When the value of fin0[i][vr] is "1", the operation of the resource assignment unit RA shifts to Step S9.

At Step S8, the resource assignment unit RA assigns the register REG (ofst_r_l[i]+opd0[i][vr]) of the processing unit OP as an input origin of the operand 0 of a $vr^{th}$ operation. Thereafter, the operation of the resource assignment unit RA shifts to Step S10.

At Step S9, the resource assignment unit RA assigns the register REG (stad_fin[i]+opd0[i][vr]) of the input buffer unit IBi as an input origin of the operand 0 of the $vr^{th}$ operation. Here, the register REG of the input buffer unit IBi (stad_fin [i]+opd0[i][vr]) means an address "stad_fin[i]+opd0[i][vr]" of the input FIFO unit IFi. Thereafter, the operation of the resource assignment unit RA shifts to Step S10.

At Step S10, the resource assignment unit RA judges whether or not a value of fin1[i][vr] is "0". When the value of fin1[i][vr] is "0", the operation of the resource assignment unit RA shifts to Step S11. When the value of fin1[i][vr] is "1", the operation of the resource assignment unit RA shifts to Step S12.

At Step S11, the resource assignment unit RA assigns the register REG (ofst_r_l[i]+opd1[i][vr]) of the processing unit OP as an input origin of an operand 1 of the $vr^{th}$ operation. Thereafter, the operation of the resource assignment unit RA shifts to Step S13.

At Step S12, the resource assignment unit RA assigns the register REG (stad_fin[i]+opd1[i][vr]) of the input buffer unit IBi as an input origin of the operand 1 of the $vr^{th}$ operation. Here, the register REG (stad_fin[i]+opd1[i][vr]) of the input buffer unit IBi means an address "stad_fin[i]+opd1[i][vr]" of the input FIFO unit IFi. Thereafter, the operation of the resource assignment unit RA shifts to Step S13.

At Step S13, the resource assignment unit RA judges, based on exec_type[i][vr], whether or not the kind of the $vr^{th}$ operation in the series i is "transfer". When the kind of the $vr^{th}$ operation is "transfer", the operation of the resource assignment unit RA shifts to Step S21. When the kind of the $vr^{th}$ operation is not "transfer", the operation of the resource assignment unit RA shifts to Step S14.

At Step S14, the resource assignment unit RA discriminates the kind of the $vr^{th}$ operation in the series i based on exec_type[i][vr]. When the kind of the $vr^{th}$ operation is "operation A", the operation of the resource assignment unit RA shifts to Step S15. When the kind of the $vr^{th}$ operation is "operation B", the operation of the resource assignment unit RA shifts to Step S16. When the kind of the $vr^{th}$ operation is "operation C", the operation of the resource assignment unit RA shifts to Step S17.

At Step S15, the resource assignment unit RA assigns the operator OPA (ofst_a+va) as an operator for the $vr^{th}$ operation. Thereafter the operation of the resource assignment unit RA shifts to Step S18.

At Step S16, the resource assignment unit RA assigns the operator OPB (ofst_b+vb) as an operator for the $vr^{th}$ operation. Thereafter, the operation of the resource assignment unit RA shifts to Step S19.

At Step S17, the resource assignment unit RA assigns the operator OPC (ofst_c+vc) as an operator for the $vr^{th}$ operation. Thereafter, the operation of the resource assignment unit RA shifts to Step S20.

At Step S18, the resource assignment unit RA makes the setting of va=va+1. Thereafter, the operation of the resource assignment unit RA shifts to Step S21.

At Step S19, the resource assignment unit RA makes the setting of vb=vb+1. Thereafter, the operation of the resource assignment unit RA shifts to Step S21.

At Step S20, the resource assignment unit RA makes the setting of vc=vc+1. Thereafter, the operation of the resource assignment unit RA shifts to Step S21.

At Step S21, the resource assignment unit RA judges whether or not a value of fout[i][vr] is "0". When the value of fout[i][vr] is "0", the operation of the resource assignment unit RA shifts to Step S22. When the value of fout[i][vr] is "1", the operation of the resource assignment unit RA shifts to Step S23.

At Step S22, the resource assignment unit RA assigns the register REG (ofst_r+vr) of the processing unit OP as an output destination of processed data of the $vr^{th}$ operation in the series i. Thereafter, the operation of the resource assignment unit RA shifts to Step S24.

At Step S23, the resource assignment unit RA assigns the register REG (stad_fout[i]+vr) of the output buffer unit OBi as an output destination of the processed data of the $vr^{th}$ operation in the series i. Here, the register REG (stad_fout [i]+vr) of the output buffer unit OBi means an address "stad_fou[i]+vr" of the output FIFO unit OFi. Thereafter, the operation of the resource assignment unit RA shifts to Step S24.

At Step S24, the resource assignment unit RA makes the setting of vr=vr+1. Thereafter, the operation of the resource assignment unit RA shifts to Step S6.

At Step S25, the resource assignment unit RA outputs the access request ARi to the memory access unit MAi in order to update the instruction information of the series i. Consequently, in the memory access unit MAi, the counter value PCVi of the program counter PCi is updated and the read command RCMMi and the read address RADMi are outputted to the instruction information memory INSMi. Therefore, the instruction information INSi for a subsequent processing cycle is supplied from the instruction information memory INSMi to the resource assignment unit RA. Thereafter, the operation of the resource assignment unit RA shifts to Step S26.

At Step S26, the resource assignment unit RA makes the setting of ofst_r_l[i]=ofst_r in order to save the offset for the register assignment for the series i in the current processing cycle. Thereafter, the operation of the resource assignment unit RA shifts to Step S27.

At Step S27, the resource assignment unit RA makes the following setting in order to update the offset for assignment of the register REG, the offset for assignment of the operators OPA, the offset for assignment of the operators OPB, and the offset for assignment of the operators OPC: ofst_r=ofst_r+vr, ofst_a=ofst_a+va, ofst_b=ofst_b+vb, and ofst_c=ofst_c+vc. Thereafter, the operation of the resource assignment unit RA shifts to Step S28.

At Step S28, the resource assignment unit RA makes the following setting: vr=0, va+0, vb=0, and vc=0. Thereafter, the operation of the resource assignment unit RA shifts to Step S29.

At Step S29, the resource assignment unit RA makes the setting of pri=pri+1. Thereafter, the operation of the resource assignment unit RA shifts to Step S3.

At Step S30, in order for the processing unit OP to execute the operations, the resource assignment unit RA generates the connection information CI indicating the result of the resource assignment determined so far to output it to the processing unit OP. In this event, when there exists an operation in which the input FIFO unit is assigned as input origins of operands 0, 1, the resource assignment unit RA outputs the input enable notification to the corresponding input FIFO unit. Further, when there exists an operation in which the output FIFO unit is assigned as an output destination of the processed data, the resource assignment unit RA outputs the output enable notification to the corresponding output FIFO unit. Thereafter, the operation of the resource assignment unit RA shifts to Step S2.

At Step S31, the resource assignment unit RA judges whether or not the number of the remaining registers REG (the number of the unassigned registers REG in the processing unit OP) is smaller than a value of opd_num[i]. When the number of the remaining registers REG is smaller than the value of opd_num[i], the operation of the resource assignment unit RA shifts to Step S26. When the number of the remaining registers REG is equal to or larger than the value of opd_num[i], the operation of the resource assignment unit RA shifts to Step S32.

At Step S32, the resource assignment unit RA judges whether or not a value of vr is smaller than the value of opd_num[i]. When the value of vr is smaller than the value of opd_num[i], the operation of the resource assignment unit RA shifts to Step S33. When the value of vr is equal to or larger than the value of opd_num[i], the operation of the resource assignment unit RA shifts to Step S26.

At Step S33, the resource assignment unit RA assigns the register REG (ofst_r+vr) of the processing unit OP as an evacuation destination from the register REG (ofst_r_l[i]+vr) of the processing unit OP. Thereafter, the operation of the resource assignment unit RA shifts to Step S34.

At Step S34, the resource assignment unit RA makes the setting of vr=vr+1 Thereafter, the operation of the resource assignment unit RA shifts to Step S32.

Here, a method of determining the internal configuration (the number of the registers REG, the number of the operators OPA, the number of the operators OPB, and the number of the operators OPC in the processing unit OP) of the processing device OPD will be described, using a concrete example. For implementing this method, a function simulation using circuit description (RTL description and the like) of the processing device OPD is utilized. Note that the circuit description of the processing device OPD used in the function simulation includes the parameter values representing the number of the registers REG in the register group RGR, the numbers of the operators OPA, the operators OPB, and the operators OPC in the operator group OGR, the number of the memories MEM and the capacity of the memories MEM in the memory group MGR, the capacity of the input FIFO unit IFi, the capacity of the output FIFO unit OFi, the threshold values VI0$i$ to VI4$i$ of the input priority level decision unit ILDi, and the threshold values VO0$i$ to VO4$i$ of the output priority level decision unit OLDi.

A case where the number of series is, for example, "2" (n=1) will be described. Note that the instruction information shown in FIG. 12 is assumed to be stored in the instruction information memory INSM0. The instruction information shown in FIG. 13 is assumed to be stored in the instruction information memory INSM1. It is assumed that in the input FIFO unit IF0, the external input data "a" is stored in an address "stad_fin[0]", the external input data "b" is stored in an address "stad_fin[0]+1", and the external input data "c" is stored in an address "stad_fin[0]+2". Further, it is assumed that in the input FIFO unit IF1, the external input data "d" is stored in an address "stad_fin[1], the external input data "e" is stored in an address "stad_fin[1]+1", the external input data "f" is stored in an address "stad_fin[1]+2", and the external input data "g" is stored in an address "stad_fin[1]+3". It is assumed that, while the function simulation in this example is being executed, a series with a $0^{th}$ priority is the series 0 and a series with a $1^{st}$ priority is the series 1. The operators OPA, OPB, OPC are assumed to be adders ADD, subtracters SUB, and multipliers MUL respectively.

First, parameter values of the number of the registers REG, the number of the adders ADD, the number of the subtracters SUB, and the number of the multipliers MUL are set to sufficiently large values (for example, "1024"), and then a first function simulation using the circuit description of the processing device OPD is executed.

FIG. 19 shows a resource assignment state and an internal variable state in the first function simulation (function simulation where the number of the resources is set to a large value). In the first function simulation, the resource assignment unit RA operates as follows.

At Step S1, upon reset release of the processing device OPD, the resource assignment unit RA makes the following setting: vr=0, va=0, vb=0, vc=0, ofst_r_l[0]=0, and ofst_r_l[1]=0. At this time, the instruction information (FIG. 12) for the $t^{th}$ cycle is supplied from the instruction information memory INS0 to the resource assignment unit RA, and the instruction information (FIG. 13) for the $t^{th}$ cycle is also supplied from the instruction information memory INSM1 to the resource assignment unit RA. Thereafter, the operation of the resource assignment unit RA shifts to Step S2.

At Step S2, the resource assignment unit RA makes the following setting: ofst_r=0, ofst_a=0, ofst_b=0, ofst_c=0, and pri=0. Thereafter, the operation of the resource assignment unit RA shifts to Step S3.

At Step S3, since pri=0 and the number of the series is "2", the judgment by the resource assignment unit RA is "fault". Therefore, the operation of the resource assignment unit RA shifts to Step S4.

At Step S4, since pri=0, the resource assignment unit RA selects a series 0 with a $0^{th}$ priority as a series to be processed. Thereafter, the operation of the resource assignment unit RA shifts to Step S5.

At Step S5, since the number of the remaining resources (the number of the registers REG: 1024, the number of the adders ADD: 1024, the number of the subtracters SUB: 1024, the number of the multipliers MUL: 1024) is larger than the number of the resources necessary for executing the operations indicated by the instruction information for the $t^{th}$ cycle on the series 0 (the number of the registers REG: 6, the number of the adders ADD: 3, the number of the subtracters SUB: 3, the number of the multipliers MUL: 0), the judgment by the resource assignment unit RA is "true". Therefore, the operation of the resource assignment unit RA shifts to Step S6.

At Step S6, since vr=0 and exec_num[0]=6, the judgment by the resource assignment unit RA is "true". Therefore, the operation of the resource assignment unit RA shifts to Step S7.

At Step S7, since fin0[0][0]=1, the judgment by the resource assignment unit RA is "false". Therefore, the operation of the resource assignment unit RA shifts to Step S9.

At Step S9, since opd0[0][0]=0, the resource assignment unit RA assigns the register REG (stad_fin[0]) of the input buffer unit IF0 as an input origin of an operand 0 of a $0^{th}$ operation in the series 0. Thereafter, the operation of the resource assignment unit RA shifts to Step S10.

At Step S10, since fin1[0][0]=1, the judgment by the resource assignment unit RA is "false". Therefore, the operation of the resource assignment unit RA shifts to Step S12.

At Step S12, since opd1[0][0]=1, the resource assignment unit RA assigns the register REG (stad_fin[0]+1) of the input buffer unit IB0 as an input origin of an operand 1 of the $0^{th}$ operation in the series 0. Thereafter, the operation of the resource assignment unit RA shifts to Step S13.

At Step S13, since the kind of the $0^{th}$ operation in the series 0 is "addition" (exec_type[0][0]=0), the judgment by the resource assignment unit RA is "false". Therefore, the operation of the resource assignment unit RA shifts to Step S14.

At Step S14, the resource assignment unit RA discriminates the kind of the $0^{th}$ operation in the series 0. Since the kind of the $0^{th}$ operation in the series 0 is "addition", the operation of the resource assignment unit RA shifts to Step S15.

At Step S15, since va=0 and ofst_a=0, the resource assignment unit RA assigns the adder ADA (0) as an operator for the $0^{th}$ operation in the series 0. Thereafter, the operation of the resource assignment unit RA shifts to Step S18.

At Step S18, the resource assignment unit RA makes the setting of va=1. Thereafter, the operation of the resource assignment unit RA shifts to Step S21.

At Step S21, since fout[0][0]=0, the judgment by the resource assignment unit RA is "true". Therefore, the operation of the resource assignment unit RA shifts to Step S22.

At Step S22, since ofst_r=0 and vr=0, the resource assignment unit RA assigns the register REG (0) of the processing unit OP as an output destination of processed data of the $0^{th}$ operation in the series 0. Thereafter, the operation of the resource assignment unit RA shifts to Step S24.

At Step S24, the resource assignment unit RA makes the setting of vr=1. The resource assignment state and the internal variable state at this time are shown in FIG. 19<1>.

Thereafter, the operation of the resource assignment unit RA shifts to Step S6. At Step S6, since vr=1 and exec_num[0]=6, the judgment by the resource assignment unit RA is "true". Therefore, the operation of the resource assignment unit RA shifts to Step S7. Then, similarly to the processing for the $t^{th}$ cycle on the $0^{th}$ operation of the series 0, the processing for the $t^{th}$ cycle on a $1^{st}$ operation of the series 0 is executed. The processing for the $t^{th}$ cycle on the $1^{st}$ operation of the series 0 is different from the processing for the $t^{th}$ cycle on the $0^{th}$ operation of the series 0 in that the kind of the $1^{st}$ operation in the $t^{th}$ cycle is "subtraction" and therefore, Steps S16, S19 are executed instead of Steps S15, S18. The resource assignment state and the internal variable state after the execution of Step S24 in the processing for the $t^{th}$ cycle on the $1^{st}$ operation of the series 0 are shown in FIG. 19<2>. Thereafter, the processing for the $t^{th}$ cycle on a $2^{nd}$ operation a $5^{th}$ operation of the series 0 is similarly executed in sequence. The resource assignment state and the internal variable state after the execution of Step S24 in the processing for the $t^{th}$ cycle on the $2^{nd}$ to $5^{th}$ operations of the series 0 are shown in FIG. 19<3> to FIG. 19 <6>. After the execution of Step S24 in the processing for the $t^{th}$ cycle on the $5^{th}$ operation of the series 0, the operation of the resource assignment unit RA shifts to Step S6.

At Step S6, since vr=6 and exec_num[0]=6, the judgment by the resource assignment unit RA is "false". Therefore, the operation of the resource assignment unit RA shifts to Step S25.

At Step S25, the resource assignment unit RA outputs the access request AR0 in order to update the instruction information on the series 0. Consequently, the instruction information for the subsequent processing cycle (the $t+1^{th}$ cycle) is supplied from the instruction information memory INSM0 to the resource assignment unit RA. Thereafter, the operation of the resource assignment unit RA shifts to Step S26.

At Step S26, since ofst_r=0, the resource assignment unit RA makes the setting of ofst_r_l[0]=0. Thereafter, the operation of the resource assignment unit RA shifts to Step S27.

At Step S27, since vr=6, va=3, vb=3, vc=0, ofst_r=0, ofst_a=0, ofst_b=0, and ofst_c=0, the resource assignment unit RA makes the following setting: ofst_r=6, ofst_a=3, ofst_b=3, and ofst_c=0. Thereafter, the operation of the resource assignment unit RA shifts to Step S28.

At Step S28, the resource assignment unit RA makes the setting of vr=0, va=0, vb=0, and vc=0. Thereafter, the operation of the resource assignment unit RA shifts to Step S29.

At Step S29, the resource assignment unit RA makes the setting of pri=1. The internal variable state at this time is shown in FIG. 19<7>. Thereafter, the operation of the resource assignment unit RA shifts to Step S3.

At Step S3, since pri=1 and the number of the series=2, the judgment by the resource assignment unit RA is "false". Therefore, the operation of the resource assignment unit RA shifts to Step S4.

At Step S4, since pri=1, a series 1 with a $1^{st}$ priority is selected as a series to be processed. Thereafter, the operation of the resource assignment unit RA shifts to Step S5.

At Step S5, since the number of the remaining resources (the number of the registers REG: 1018, the number of the adders ADD: 1021, the number of the subtracters SUB: 1021, the number of the multipliers MUL: 1024) is larger than the number of the resources necessary for executing operations indicated by the instruction information for the $t^{th}$ cycle on the series 1 (the number of the registers REG: 2, the number of the adders ADD: 2, the number of the subtracters SUB: 0, the number of the multipliers MUL: 0), the judgment by the resource assignment unit RA is "true". Therefore, the operation of the resource assignment unit RA shifts to Step S6.

At Step S6, since vr=0 and exec_num[1]=2, the judgment by the resource assignment unit RA is "true". Therefore, the operation of the resource assignment unit RA shifts to Step S7. From this step onward, similarly to the processing for the $t^{th}$ cycle on the $0^{th}$ to $5^{th}$ operations of the series 0, processings for the $t^{th}$ cycle on a $0^{th}$ operation and a $1^{st}$ operation of the series 1 are executed in sequence. The resource assignment state and the internal variable state after the execution of Step S24 in the processing for the $t^{th}$ cycle on the $0^{th}$ operation and the $1^{st}$ operation of the series 1 are shown in FIG. 19<8> and FIG. 19<9>. After the execution of Step S24 in the processing for the $t^{th}$ cycle on the $1^{st}$ operation of the series 1, the operation of the resource assignment unit shifts to Step S6.

At Step S6, since vr=2 and exec_num[1]=2, the judgment by the resource assignment unit RA is "false". Therefore, the operation of the resource assignment unit RA shifts to Step S25. Then, similarly to the case of the series 0, Steps S25 to S29 are sequentially executed. The internal variable state after the execution of Step S29 is shown in FIG. 19<10>. Thereafter, the operation of the resource assignment unit RA shifts to Step S3.

At Step S3, since pri=2 and the number of the series is "2", the judgment by the resource assignment unit RA is "true". Therefore, the operation of the resource assignment unit RA shifts to Step S30.

At Step S30, the resource assignment unit RA outputs the connection information CI indicating the result of the resource assignment determined so far and also outputs the input enable notifications IEN0, 1. Therefore, the $0^{th}$ operation to $5^{th}$ operation of the series 0 for the $t^{th}$ cycle and the $0^{th}$ operation and the $1^{st}$ operation of the series 1 for the $t^{th}$ cycle are executed in parallel by the processing unit OP in the $t^{th}$ cycle. Consequently, the processing for the $t^{th}$ cycle is completed. Thereafter, the operation of the resource assignment unit RA shifts to Step S2.

At Step S2, the resource assignment unit RA makes the following setting: ofst_r=0, ofst_a=0, ofst_b=0, ofst_c=0, and pri=0. The internal variable state at this time is shown in FIG. 19<11>. Thereafter, the operation of the resource assignment unit RA shifts to Step S3. From this step onward, processing for the t+1$^{th}$ cycle, processing for the t+2$^{th}$ cycle, and processing for the t+3$^{th}$ cycle are executed in sequence, similarly to the processing for the $t^{th}$ cycle. The resource assignment state and the internal variable state in the above processing are shown in FIG. 19<12>~<27>. Consequently, the first function simulation is completed.

In the first function simulation, the parameter values of the number of the registers REG, the number of the adders ADD, the number of the subtracters SUB, and the number of the multipliers MUL are "1024", while the number of the registers REG, the number of the adders ADD, the number of the subtracters SUB, and the number of the multipliers MUL actually used in the execution of the operations in each processing cycle are as follows. To allow the acquisition of these numbers, for example, the values of ofst_r, ofst_a, and ofst_b, ofst_c are stored every time Step S30 is executed.

(the $t^{th}$ cycle) REG: 8, ADD: 5, SUB: 3, MUL: 0
(the t+1$^{th}$ cycle) REG: 4, ADD: 1, SUB: 0, MUL: 3
(the t+2$^{th}$ cycle) REG: 3, ADD: 1, SUB: 0, MUL: 1
(the t+3$^{th}$ cycle) REG: 1, ADD: 1, SUB: 0, MUL: 0

Therefore, it is seen that in order to execute the arithmetic processing on the series 0, 1 under the resource assignment in the first function simulation, the sufficient numbers of the registers REG, the adders ADD, the subtracters SUB, and the multipliers MUL provided in the processing unit OP are 8, 5, 3, and 3 respectively. However, if the number of the registers REG, the number of the adders ADD, the number of the subtracters SUB, and the number of the multipliers MUL are thus determined as the peak values of the numbers required in the processing cycles, the arithmetic processing on the series 0, 1 is often executed at a higher speed than necessary relative to the throughput required for the processing device OPD.

Therefore, in executing the second function simulation using the circuit description of the processing device OPD, the parameter values of the number of the registers REG, the number of the adders ADD, the number of the subtracters SUB, and the number of the multipliers MUL are set to values smaller than the values used in the execution of the operations in the first function simulation. For example, the parameter value of the number of the registers REG is set to "8", the parameter value of the number of the adders ADD is set to "3", the parameter value of the number of the subtracters SUB is set to "3", and the parameter value of the number of the multipliers MUL is set to "3".

FIG. 20 shows the resource assignment state and the internal variable state in the second function simulation (function simulation where the number of the resources is set smaller). In the second function simulation, the resource assignment unit RA operates as follows.

First, similarly to the first function simulation, the processing based on the instruction information for the $t^{th}$ cycle on the series 0 (the $0^{th}$ operation to $5^{th}$ operation) is executed. The resource assignment state and the internal variable state after the execution of Step S24 in the processing based on the instruction information for $t^{th}$ cycle on the series 0 are shown in FIG. 20<1> to <6>. The internal variable state after the execution of Step S29 in the processing based on the instruction information for the $t^{th}$ cycle on the series 0 is shown in FIG. 20<7>. Thereafter, the operation of the resource assignment unit RA shifts to Step S3.

At Step S3, since pri=1 and the number of the series is "2", the judgment by the resource assignment unit RA is "false". Thereafter, the operation of the resource assignment unit RA shifts to Step S4.

At Step S4, since pri=1, the resource assignment unit RA selects the series 1 with the $1^{st}$ priority as a series to be processed. Thereafter, the operation of the resource assignment unit RA shifts to Step S5.

At Step S5, the number of the remaining resources (the number of the registers REG: 2, the number of the adders ADD: 0, the number of the subtracters SUB: 0, the number of the multipliers MUL: 3) is smaller than the number of the resources (the number of the registers R: 2, the number of the adders ADD: 2, the number of the subtracters: 0, the number of the multipliers MUL: 0) necessary for executing the operations indicated by the instruction information for the $t^{th}$ cycle on the series, more specifically, the numbers of the registers REG, the subtracters SUB, and the multipliers MUL are large enough but the number of the adders ADD is smaller than necessary, and therefore, the judgment by the resource assignment unit RA is "false". Therefore, the operation of the resource assignment unit RA shifts to Step S31.

At Step 31, since the number of the remaining registers REG is "2" and opd_num[1][0]=0, the judgment by the resource assignment unit RA is "false". Therefore, the operation of the resource assignment unit RA shifts to Step S32.

At Step S32, since vr=0 and opd_num[1][0]=0, the judgment by the resource assignment unit RA is "false". Therefore, the operation of the resource assignment unit shifts to Step S26. Then, Steps S26 to S29 are executed in sequence. The internal variable state after the execution of Step S29 is shown in FIG. 20<8>. At this time, since Step S25 is not executed, the instruction information for the subsequent cycle (the t+1$^{th}$ cycle) on the series 1 is not supplied. Therefore, the operation indicated by the instruction information for the current processing cycle (the t$^{th}$ cycle) is executed in the subsequent processing cycle (the t+1$^{th}$ cycle). Thereafter, the operation of the resource assignment unit RA shifts to Step S3.

At Step S3, since pri=2 and the number of the series is "2", the judgment by the resource assignment unit RA is "true". Therefore, the operation of the resource assignment unit RA shifts to Step S30.

At Step S30, since the resources are assigned only to the operations indicated by the instruction information for the t$^{th}$ cycle on the series 0, only the 0$^{th}$ operation to the 5$^{th}$ operation of the series 0 for the t$^{th}$ cycle are executed in parallel in the t$^{th}$ cycle. Thereafter, the operation of the resource assignment unit RA shifts to Step S2.

At Step S2, the resource assignment unit RA makes the following setting: ofst_r=0, ofst_a=0, ofst_b=0, ofst_c=0, and pri=0. The internal variable state at this time is shown in FIG. 20<9>. Thereafter, the operation of the resource assignment unit RA shifts to Step S3. Then, the processing based on the instruction information for the t+1$^{th}$ cycle on the series 0 is executed. The resource assignment state and the internal variable state in the processing based on the instruction information for the t+1$^{th}$ cycle on the series 0 are shown in FIG. 20<10> to <13>. After the execution of Step S29 in the processing based on the instruction information for the t+1$^{th}$ cycle on the series 0, the operation of the resource assignment unit RA shifts to Step S5.

At Step S5, the number of the remaining resources (the number of the registers REG: 5, the number of the adders ADD: 3, the number of the subtracters SUB: 3, the number of the multipliers MUL: 0) is larger than the number of the resources necessary for executing the operations indicated by the instruction information for the t$^{th}$ cycle on the series 1 (the number of the registers: REG: 2, the number of the adders ADD: 2, the number of the subtracters SUB: 0, the number of the multipliers MUL: 0), that is, the numbers of all kinds of the resources are large enough, the judgment by the resource assignment unit RA is "true". Therefore, the operation of the resource assignment unit RA shifts to Step S6. Then, the processing based on the instruction information for the t$^{th}$ cycle on the series 1 is executed. The resource assignment state and the internal variable state in the processing based on the instruction information for the t$^{th}$ cycle on the series 1 are shown in FIG. 20<14>~<17>. Consequently, in the t+1$^{th}$ cycle, the operations indicated by the instruction information for the t+1$^{th}$ cycle on the series 0 are executed and the operations indicated by the instruction information for the t$^{th}$ cycle on the series 1 are also executed. From this step onward, the processing for the t+2$^{th}$ cycle and the processing for the t+3$^{th}$ cycle are executed in sequence. The resource assignment state and the internal variable state in the above processing are shown in FIG. 20<18> to <28>. Consequently, the second function simulation is completed.

In the second function simulation, the parameter value of the number of the registers REG is "8", the parameter value of the number of the adders ADD is "3", the parameter value of the number of the subtracters is "3", and the parameter value of the number of the multipliers MUL is "3", while the number of the registers REG, the number of the adders ADD, the number of the subtracters SUB, and the number of the multipliers MUL actually used in the execution of the operations in each processing cycle are as follows.

(the t$^{th}$ cycle) REG: 6, ADD: 3, SUB: 3, MUL: 0
(the t+1$^{th}$ cycle) REG: 5, ADD: 2, SUB: 0, MUL: 3
(the t+2$^{th}$ cycle) REG: 3, ADD: 2, SUB: 0, MUL: 0
(the t+3$^{th}$ cycle) REG: 2, ADD: 1, SUB: 0, MUL: 1

Therefore, it is seen that in order to execute the arithmetic processing on the series 0, 1 under the resource assignment in the second function simulation, the sufficient numbers of the registers REG, the adders ADD, the subtracters SUB, and the multipliers MUL provided in the processing unit OP are 6, 3, 3, and 3 respectively. In this example, the operations indicated by the instruction information on the series 1 are shifted to the immediately subsequent cycle. However, even if the arithmetic processing on the series 1 is called many times to be continuously executed, this does not pose any problem, providing that the data output timing required for the output buffer unit OBl corresponding to the series 1 is satisfied. Specifically, in a case where data in the series 1 for one arithmetic processing are stored in the input FIFO unit IFl and outputted from the output FIFO unit OF1 once per 4 cycles, if the arithmetic processing on the series 1 processed in 3 cycles is executed in any 3 cycles out of the t$^{th}$ cycle the t+3$^{th}$ cycle, the throughput of the processing device OPD is maintained.

This example has described the case where the priority sequence of the series 0 is always higher than the priority sequence of the series 1 in the priority sequence information PI sent to the resource assignment unit RA from the arbiter unit ABT during the execution of the function simulation, but if the resource assignment for the series 1 is postponed one after another, input data of the series 1 are left unprocessed and output data of the series 1 decrease, and in course of time, the priority sequence of the series 1 becomes higher than the priority sequence of the series 0. In such a case, the resource assignment for the series 1 is first executed and the resource assignment for the series 0 is subsequently executed. In this manner, in the control operation, the resource assignment is executed in a well-balanced manner for both of them, so that the throughputs of both of the series are maintained. Thereafter, the parameter values of the number of the registers REG, the number of the adders ADD, the number of the subtracters SUB, and the number of the multipliers MUL are set to values smaller than the values used in the execution of the operations in the second function simulation, and then a third function simulation using the circuit description of the processing device OPD is executed. For example, the parameter value of the number of the registers REG is set to "8", the parameter value of the number of the adders ADD is set to "2", the parameter value of the number of the subtracters SUB is set to "3", and the parameter value of the number of the multipliers MUL is set to "3". Since the minimum necessary number of the adders ADD to be provided in the processing unit OP in order to allow the execution of the arithmetic processing on the series 0 is "3", the third function simulation is forcibly terminated because the data output timing required for the output buffer unit OB0 corresponding to the series 0 cannot be satisfied.

Therefore, the number of the registers REG, the number of the adders ADD, the number of the subtracters SUB, and the number of the multiplier MUL in the processing unit OP are finally determined as the number of the registers REG (6), the number of the adders ADD (3), the number of the subtracters SUB (3), and the number of the multipliers MUL (3) used in the execution of the operations in the second function simulation. This can minimize the number of the registers REG, the number of the adders ADD, the number of the subtracters SUB, and the number of the multipliers MUL in the processing unit OP without causing any deterioration in throughput of the processing device OPD. That is, it is possible to reduce a circuit area while maintaining processing performance of the processing device OPD. Incidentally, though the case where the number of the series is "2" has been described here, the present invention has a larger effect as the number of the series becomes larger. As the number of the series is larger, the number of opportunities where the resources (the registers REG, the adders ADD, the subtracters SUB, and the multipliers MUL) of the processing unit OP are assigned to the operations increases, and therefore, in a very long term, the registers REG, the adders ADD, the subtracters SUB, and the multipliers MUL are utilized to the maximum on the average and the numbers thereof can be minimized.

Figure 21:
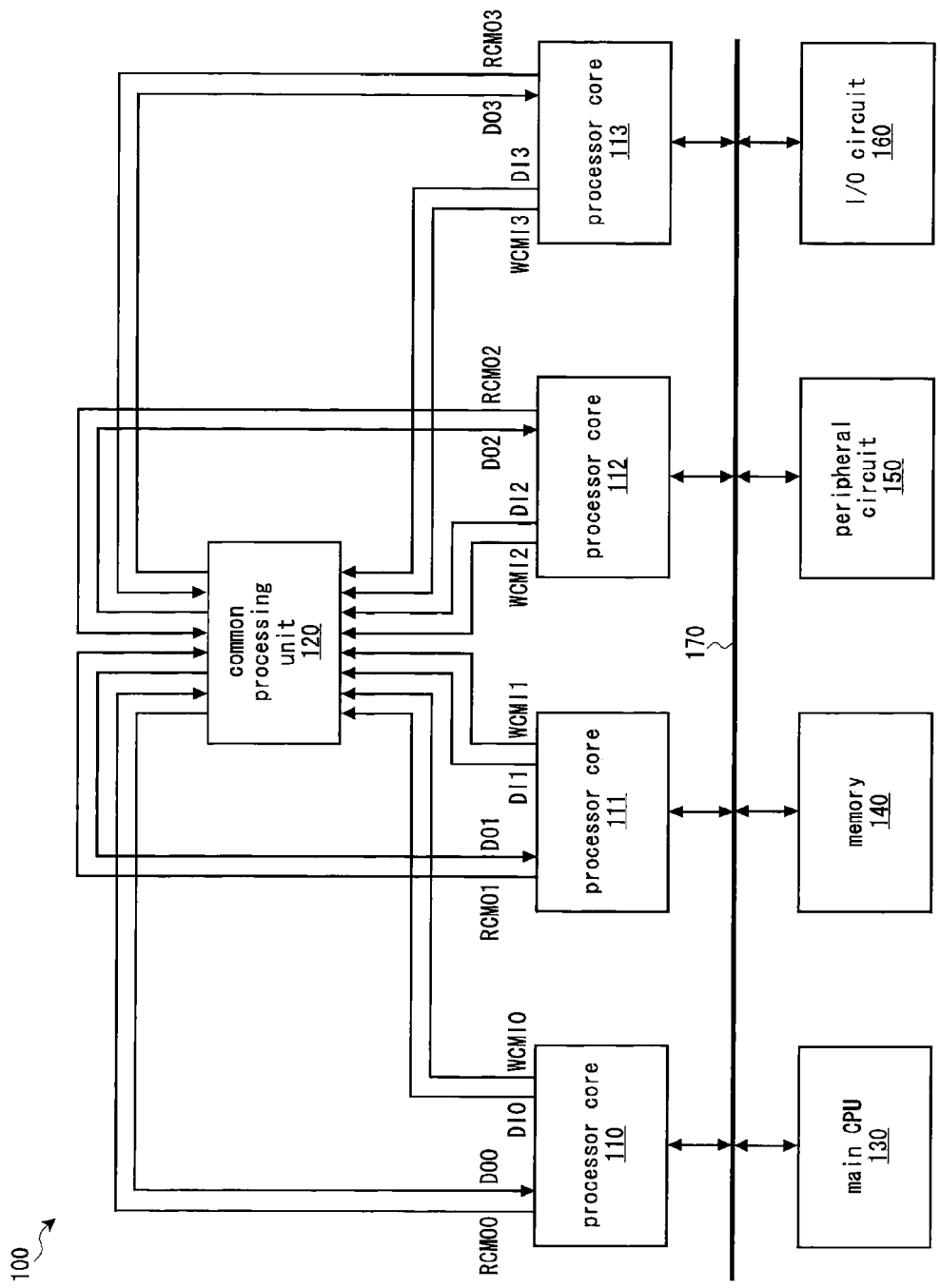
FIG. 21 is a block diagram showing an application example of a processing device in FIG. 6.

FIG. 21 shows an application example of the processing device in FIG. 6. A multiprocessor 100 includes: processor cores 110~113 in charge of arithmetic processings of series 0~3 respectively; a common processing unit 120 provided in common to the processor cores 110~113; a main CPU 130 controlling the entire multiprocessor 100; a memory 140 storing various kinds of data; a peripheral circuit 150 realizing a timer function, a communication interface function, and so on; an I/O circuit 160 exchanging data with an external part; and a network 170. The network 170 connects the processor cores 110~113, the main CPU 130, the memory 140, the peripheral circuit 150, and the I/O circuit 160 to one another to enable data exchange thereamong. Note that in the multiprocessor 100, the processor cores 110~113, the main CPU 130, the memory 140, the peripheral circuit 150, and the I/O circuit 160, though connected via the network 170, may be connected via a bus.

The common processing unit 120 is constituted of the processing device OPD (n=3) in FIG. 6. In the common processing unit 120, the write commands WCMI1~WCMI3 and the external input data DI0~DI3 to the input buffer units IB0~IB3 (FIG. 6), and the read commands RCMO0~RCMO3 to the output buffer units OB0~OB3 (FIG. 6) are supplied from the processor cores 110~113 respectively. The external output data DO0~DO3 from the output buffer units OB0~OB3 are supplied to the processor cores 110~113 respectively.

In the multiprocessor 100 as structured above, each of the processor cores 110~113 makes the common processing unit 120 execute arithmetic processing requiring high speed, among arithmetic processings assigned to itself. The common processing unit 120 executes the arithmetic processing in place of the processor cores 110~113, according to processing requests from the processor cores 110~113. At this time, in the common processing unit 120, the arithmetic processings are executed according to a priority sequence of the processing requests from the processor cores 110~113, and balance is maintained so that delay in the required processing speed does not occur in any of the processor cores 110~113, and consequently high optimization is realized as the entire multiprocessor 100 in terms of processing performance and resource usage efficiency.

Further, in the multiprocessor 100, when application is installed in each of the processor cores 110~113, the number of processing resources can be handled as very large in software design for each of the processor cores 110~113. Owing to the optimization of the resource usage efficiency fulfilled by the common processing unit 120, software design is very much facilitated compared with software design in installing application in a conventional multiprocessor.

Figure 22:
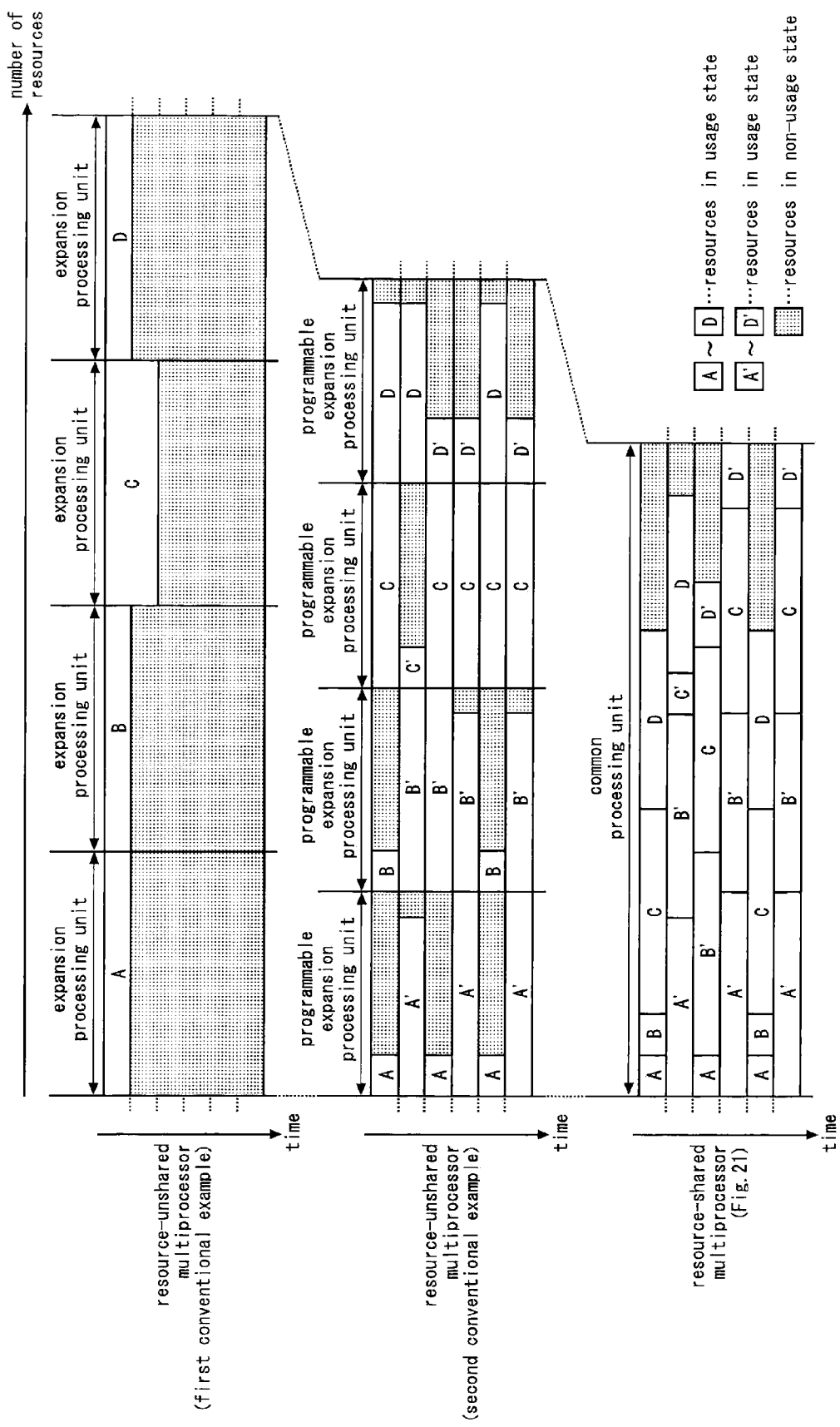
FIG. 22 is an explanatory chart showing usage efficiency of resources in a multiprocessor.

FIG. 22 shows usage efficiency of resources in a multiprocessor. FIG. 22 shows usage efficiency of processing resources regarding a resource-unshared multiprocessor in which expansion processing units are provided in correspondence with four processor cores respectively (a first conventional example), a resource-unshared multiprocessor in which programmable expansion processing units are provided in correspondence with four processor cores respectively (a second conventional example), and a resource-shared multiprocessor in which a common processing unit is provided in common to four processor cores (the multiprocessor 100 in FIG. 21). In the drawing, the horizontal axis represents the number of resources (resource area) and the vertical axis represents the time. Further, portions with A~D and without hatch correspond to resources in use for arithmetic processings A~D of certain application. Portions with A'~D' and without hatch correspond to resources in use for arithmetic processings A'~D' of another application. Hatched portions correspond to resources not in use for any arithmetic processing.

By referring to FIG. 22, it is seen that in the resource-unshared multiprocessor (the first conventional example), when the application is in a non-operation state, the processing resources are also in a non-usage state and thus resource usage efficiency is very low. It is also seen that in the resource-unshared multiprocessor (the second conventional example), the resource non-usage state often appears as the whole multiprocessor even when the arithmetic processings of the two applications are executed by a time-division multiplexing method since the processing resources are provided independently for each of the processor cores. On the other hand, it is seen that in the resource-shared multiprocessor (the multiprocessor 100 in FIG. 21), the number of the resources is reduced to a minimum and the resources are efficiently used since the processing resource (the common processing unit 120 in FIG. 21) is shared by the processor cores.

Incidentally, the above embodiment has described the example where the memories MEM are not used as the resources assigned to the operations, but the present invention is not limited to such an embodiment. For example, in a case where the processed data of a certain operation is not used for a long period of time, the memory MEM instead of the register REG may be assigned as the storage destination of the processed data of this operation. Further, the above embodiment has described the case where Steps S2~S34 shown in FIG. 17 and FIG. 18 are executed in the same processing cycle, but the present invention is not limited to such an embodiment. Higher efficiency of the processing may be realized by utilizing, for example, a pipeline method.

The above embodiment has described the case where, in executing the function simulation, the parameter values of the number and capacities of the memories MEM in the memory group MGR, the capacity of the input FIFO unit IFi, the capacity of the output FIFO unit OFi, the threshold values VI0$i$ to VI4$i$ of the input priority level decision unit ILDi, and the threshold values VO0$i$~VO4$i$ of the output priority level decision unit OLDi are not changed, but the present invention is not limited to such an embodiment. For example, in order to further reduce the number of the resources of the processing unit OP, the function simulation may be executed while these parameter values are varied.

The invention is not limited to the above embodiments and various modifications may be made without departing from the spirit and scope of the invention. Any improvement may be made in part or all of the components.

What is claimed is:

1. A processing device comprising:
a plurality of input buffer units which are provided in correspondence with a plurality of data series and store input data to output the input data as data to be processed;
a processing unit which changes an arithmetic processing function by establishing a connection relation of internal components according to connection information to execute desired arithmetic processing on the data to be processed and output processed data;
a plurality of output buffer units which are provided in correspondence with said data series and store the processed data to output the processed data as output data; and
a control unit which, in each processing cycle, determines the components of said processing unit to be assigned to an operation, which is indicated by instruction information corresponding to the data series, when the operation is executable, shifts a processing cycle in which the operation is to be executed to a subsequent processing cycle upon satisfying a data output timing from said output buffer unit when the operation is not executable due to lack of the components of said processing unit, and outputs an assignment of the components of said processing unit as the connection information.

2. The processing device according to claim 1, wherein:
each of said input buffer units includes:
a first data storage unit which stores the input data in response to a write request and outputs the input data as the data to be processed in response to a read request; and
a first priority information generating unit which outputs first priority information indicating priority based on the amount of the input data stored in said first data storage unit;
each of said output buffer units includes:
a second data storage unit which stores the processed data in response to a write request and outputs the processed data as the output data in response to a read request; and
a second priority information generating unit which outputs second priority information indicating priority based on the amount of the processed data stored in said second data storage unit; and
said control unit includes:
a priority sequence decision unit which decides a priority sequence of said data series according to the first priority information and the second priority information; and
a component assignment unit which determines the components of said processing unit or shifts the processing cycle in an ascending order of the priority sequence and outputs an assignment of the components of said processing unit as the connection information.

3. The processing device according to claim 2, wherein said first priority information generating unit includes:
a first counter which counts up in accordance with a data storage operation of said first data storage unit, while counting down in accordance with a data output operation of said first data storage unit; and
a first priority decision unit which compares a counter value of said first counter with a first threshold value to decide priority and outputs first priority information indicating the decided priority.

4. The processing device according to claim 3, wherein said first priority decision unit includes a first threshold value setting unit setting said first threshold value.

5. The processing device according to claim 2, wherein said second priority information generating unit includes:
a second counter which counts up in accordance with a data storage operation of said second data storage unit, while counting down in accordance with a data output operation of said second data storage unit; and
a second priority decision unit which compares a counter value of said second counter with a second threshold value to decide priority and outputs second priority information indicating the decided priority.

6. The processing device according to claim 5, wherein said second priority decision unit includes a second threshold value setting unit setting said second threshold value.

7. The processing device according to claim 2, wherein said priority sequence decision unit includes:
a plurality of third priority decision units provided in correspondence with said data series and each deciding priority by referring to the first priority information supplied from a corresponding input buffer unit, the second priority information supplied from a corresponding output buffer unit, and a priority definition table and outputting third priority information indicating the decided priority; and
an arbiter unit which decides a priority sequence of said data series according to the plural pieces of third priority information supplied from said third priority decision units.

8. The processing device according to claim 1, wherein said processing unit includes:
a plurality of registers, a plurality of operators, and a plurality of memories as the components; and
a connection relation changing unit changing a connection relation of said registers, said operators, and said memories according to said connection information.

9. The processing device according to claim 1, wherein the instruction information supplied to said control unit includes information indicating a number of operations in each of the processing cycles as well as information indicating a kind of the operation and information for identifying the data to be processed in each of the operations.

10. A method of determining an internal configuration of a processing device which comprises: a plurality of input buffer units which are provided in correspondence with a plurality of data series and store input data to output the input data as data to be processed; a processing unit which changes an arithmetic processing function by establishing a connection relation of internal components according to connection information, in order to execute desired arithmetic processing on the data to be processed in each of said data series and output processed data; a plurality of output buffer units which are provided in correspondence with said data series and store the processed data to output the processed data as output data; and a control unit which, in each processing cycle, determines the components of said processing unit to be assigned to an operation, which is indicated by the instruction information corresponding to the data series, when the operation is executable, shifts a processing cycle in which the operation is to be executed to a subsequent processing cycle when the operation is not executable due to lack of the components of said processing unit, and outputs an assignment of the components of said processing unit as the connection information the method comprising:
a first step of setting, by using circuit description of said processing device, a number of the components of said processing unit to a value with which the operation is always executable in said control processing, and executing a simulation, the circuit description including a parameter value representing the number of the components of said processing unit;

a second step of obtaining, as a virtual design value, from a result of the simulation in said first step, the number of the components of said processing unit which are assigned to the operation by said control unit in the simulation;

a third step of repeatedly executing the simulation until a data output timing of said output buffer unit is no longer satisfied, by using the circuit description of said processing device, while sequentially decreasing the number of the components of said processing unit starting from an initial value smaller than said virtual design value, the circuit description the including a parameter value representing the number of the components of said processing unit; and a fourth step of obtaining, as a real design value, the number of the components of said processing unit assigned to the operation by said control unit in a final simulation, from a result of the final simulation which is among the simulations executed in said third step and in which a data output timing of said output buffer unit is satisfied.

11. The method according to claim 10, wherein:

said processing unit includes a plurality of registers, a plurality of operators, and a plurality of memories as the components; and a connection relation changing unit changing a connection relation of said registers, said operators, and said memories according to said connection information; and the simulation is executed in said first and third steps by using the circuit description of said processing device, the circuit description including parameter values representing numbers of said registers, said operators, and said memories as the number of the components of said processing unit.

12. The method according to claim 11, wherein the simulation is executed in said first and third steps by using the circuit description of said processing device, the circuit description including a parameter value representing a capacity of each of said memories in addition to the parameter values representing the numbers of said registers, said operators, and said memories.

13. The method according to claim 10, wherein:

each of said input buffer units includes a first data storage unit which stores the input data in response to a write request and outputs the input data as the data to be processed in response to a read request; and a first priority information generating unit which outputs first priority information indicating priority based on the amount of the input data stored in said first data storage unit;

each of said output buffer units includes a second data storage unit which stores the processed data in response to a write request and outputs the processed data as the output data in response to a read request; and a second priority information generating unit which outputs second priority information indicating priority based on the amount of the processed data stored in said second data storage unit; and said control unit includes a priority sequence decision unit which decides a priority sequence of said data series according to the first priority information and the second priority information; and a component assignment unit which determines the components of said processing unit or shifts the processing cycle in an ascending order of the priority sequence and outputs an assignment of the components of said processing unit as the connection information;

said first priority information generating unit includes a first counter which counts up in accordance with a data storage operation of said first data storage unit, while counting down in accordance with a data output operation of said first data storage unit; and a first priority decision unit which compares a counter value of said first counter with a first threshold value to decide priority and outputs first priority information indicating the decided priority; and the simulation is executed in said first and third steps by using the circuit description of said processing device, the circuit description including parameter values representing a capacity of said first data storage unit and the first threshold value in addition to the parameter value representing the number of the components of said processing unit.

14. The method according to claim 10, wherein:

each of said input buffer units includes a first data storage unit which stores the input data in response to a write request and outputs the input data as the data to be processed in response to a read request; and a first priority information generating unit which outputs first priority information indicating priority based on the amount of the input data stored in said first data storage unit;

each of said output buffer units includes a second data storage unit which stores the processed data in response to a write request and outputs the processed data as the output data in response to a read request; and a second priority information generating unit which outputs second priority information indicating priority based on the amount of the processed data stored in said second data storage unit; and said control unit includes a priority sequence decision unit which decides a priority sequence of said data series according to the first priority information and the second priority information; and a component assignment unit which determines the components of said processing unit or shifts the processing cycle in an ascending order of the priority sequence and outputs an assignment of the components of said processing unit as the connection information;

said second priority information generating unit includes a second counter which counts up in accordance with a data storage operation of said second data storage unit, while counting down in accordance with a data output operation of said second data storage unit; and a second priority decision unit which compares a counter value of said second counter with a second threshold value to decide priority and outputs second priority information indicating the decided priority; and the simulation is executed in said first and third steps by using the circuit description of said processing device, the circuit description including parameter values representing a capacity of said second data storage unit and the second threshold value in addition to the parameter value representing the number of the components of said processing unit.

15. A processing system comprising:

a plurality of main processing units corresponding to a plurality of data series; and a sub processing unit provided in common to said main processing units and executing arithmetic processing in place of said main processing units, wherein said sub processing unit comprises:

a plurality of input buffer units which are provided in correspondence with said plural data series and store input data to output the input data as data to be processed;

a processing unit which changes an arithmetic processing function by establishing a connection relation of internal components according to connection information to execute desired arithmetic processing on the data to be processed and output processed data;

a plurality of output buffer units which are provided in correspondence with said data series and store the processed data to output the processed data as output data; and a control unit which, in each processing cycle, determines the components of said processing unit to be assigned to an operation, which is indicated by the instruction information corresponding to the data series, when the operation is executable, shifts a processing cycle in which the operation is to be executed to a subsequent processing cycle upon satisfying a data output timing from said output buffer unit when the operation is not executable due to lack of the components of said processing unit, and outputs an assignment of the components of said processing unit as the connection information.

16. The processing system according to claim 15, wherein:

each of said input buffer units includes:

a first data storage unit which stores the input data in response to a write request and outputs the input data as the data to be processed in response to a read request; and a first priority information generating unit which outputs first priority information indicating priority based on the amount of the input data stored in said first data storage unit;

each of said output buffer units includes:

a second data storage unit which stores the processed data in response to a write request and outputs the processed data as the output data in response to a read request; and a second priority information generating unit which outputs second priority information indicating priority based on the amount of the processed data stored in said second data storage unit; and said control unit includes:

a priority sequence decision unit which decides a priority sequence of said data series according to the first priority information and the second priority information; and a component assignment unit which determines the components of said processing unit or shifts the processing cycle in an ascending order of the priority sequence and outputs an assignment of the components of said processing unit as the connection information.

17. The processing system according to claim 16, wherein said first priority information generating unit includes:

a first counter which counts up in accordance with a data storage operation of said first data storage unit, while counting down in accordance with a data output operation of said first data storage unit; and a first priority decision unit which compares a counter value of said first counter with a first threshold value to decide priority and outputs first priority information indicating the decided priority.

18. The processing system according to claim 17, wherein said first priority decision unit includes a first threshold value setting unit setting said first threshold value.

19. The processing system according to claim 16, wherein said second priority information generating unit includes:

a second counter which counts up in accordance with a data storage operation of said second data storage unit, while counting down in accordance with a data output operation of said second data storage unit; and a second priority decision unit which compares a counter value of said second counter with a second threshold value to decide priority and outputs second priority information indicating the decided priority.

20. The processing system according to claim 19, wherein said second priority decision unit includes a second threshold value setting unit setting said second threshold value.

21. The processing system according to claim 16, wherein said priority sequence decision unit includes:

a plurality of third priority decision units provided in correspondence with said data series and each deciding priority by referring to the first priority information supplied from a corresponding input buffer unit, the second priority information supplied from a corresponding output buffer unit, and a priority definition table and outputting third priority information indicating the decided priority; and an arbiter unit which decides a priority sequence of said data series according to the plural pieces of third priority information supplied from said third priority decision units.

22. The processing system according to claim 15, wherein said processing unit includes:

a plurality of registers, a plurality of operators, and a plurality of memories as the components; and a connection relation changing unit changing a connection relation of said registers, said operators, and said memories according to said connection information.

23. The processing system according to claim 15, wherein the instruction information supplied to said control unit includes information indicating a number of operations in each of the processing cycles as well as information indicating a kind of the operation and information for identifying the data to be processed in each of the operations.

* * * * *